United States Patent [19]

Cox et al.

[11] 4,192,184

[45] Mar. 11, 1980

[54] MASS FLOWMETER

[75] Inventors: Bruce M. Cox, Duncan, Okla.; Morris D. Ho, Walnut Creek, Calif.

[73] Assignee: Halliburton Company, Duncan, Okla.

[21] Appl. No.: 960,518

[22] Filed: Nov. 13, 1978

[51] Int. Cl.² ............................................. G01F 1/84
[52] U.S. Cl. ................................. 73/194 B; 73/32 A; 73/194 M
[58] Field of Search ............... 73/194 M, 194 B, 32 A

[56] References Cited

U.S. PATENT DOCUMENTS

| | | | |
|---|---|---|---|
| 2,635,462 | 4/1953 | Poole et al. | 73/32 |
| 2,754,676 | 7/1956 | Poole | 73/32 |
| 2,834,209 | 5/1958 | Jones et al. | 73/194 |
| 2,865,201 | 12/1958 | Roth | 73/194 |
| 2,889,702 | 6/1959 | Brooking | 73/32 |
| 2,923,154 | 2/1960 | Powers et al. | 73/194 |
| 2,926,522 | 3/1960 | Kritz | 73/32 |
| 2,934,951 | 5/1960 | Li | 73/194 |
| 2,943,476 | 7/1960 | Berstein | 73/32 |
| 2,956,431 | 10/1960 | Westerheim | 73/32 |
| 3,049,917 | 8/1962 | Alspach et al. | 73/194 |
| 3,049,919 | 8/1962 | Roth | 73/228 |
| 3,080,750 | 3/1963 | Wiley et al. | 73/194 |
| 3,087,325 | 4/1963 | Roth | 73/3 |
| 3,108,475 | 10/1963 | Henderson | 73/194 |
| 3,132,512 | 5/1964 | Roth | 73/194 |
| 3,218,851 | 11/1965 | Sipin | 73/194 |
| 3,251,226 | 5/1966 | Cushing | 73/205 |
| 3,276,257 | 10/1966 | Roth | 73/194 |
| 3,298,221 | 1/1967 | Miller et al. | 73/32 |
| 3,320,791 | 5/1967 | Banks | 73/32 |
| 3,329,019 | 7/1967 | Sipin | 73/194 |
| 3,339,400 | 9/1967 | Banks | 73/32 |
| 3,350,936 | 11/1967 | Li | 73/194 |
| 3,355,944 | 12/1967 | Sipin | 73/194 |
| 3,385,104 | 5/1968 | Banks | 73/32 |
| 3,396,579 | 8/1968 | Souriau | 73/194 |
| 3,485,098 | 12/1969 | Sipin | 73/194 |
| 3,927,565 | 12/1975 | Pavlin et al. | 73/194 M |
| 4,127,028 | 11/1978 | Cox et al. | 73/194 M |

OTHER PUBLICATIONS

"Effect of a Coriolis Force on the Stability Plane Poiseuille Flow", Flaherty et al., American Institute of Physics, pp. 718–726, May, 1978.

Primary Examiner—Donald O. Woodiel
Attorney, Agent, or Firm—John H. Tregoning; Floyd A. Gonzalez

[57] ABSTRACT

Disclosed is a mass flow rate meter having two U-shaped flow loops, means for vibrating the flow loops like the tines of a tuning fork, timing means on the loops for sensing the difference in times between the passing of the sides of the loop through the static plane of the loops, and sensing means for determining which side of the U-shaped tubes went through the static plane first. The time between the passing of the sides of the loops during one half cycle of the vibrations of the loops is combined with the time of another half cycle of the vibrations dependent upon which side of the loops pass through the static plane first. An embodiment is further disclosed having a microprocessor for combining the times, and for comparing these times with a selectable variance from the time of a predetermined set of vibrations before the present time measurement is accepted. Electronic circuitry is also disclosed which improves the time measurement of the timing means.

20 Claims, 18 Drawing Figures

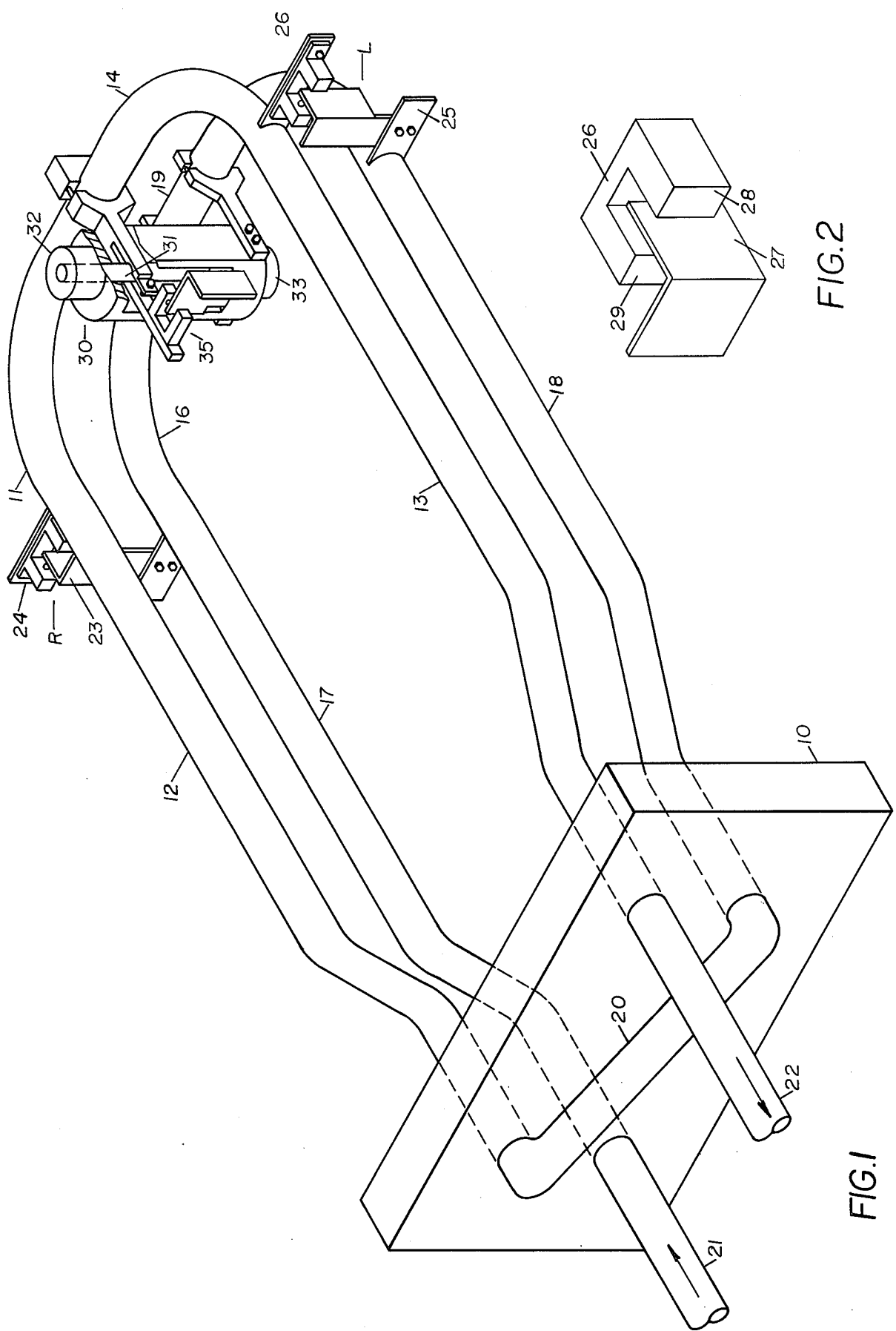

MASS FLOWMETER

BACKGROUND AND SUMMARY OF THE INVENTION

This invention relates to a means for measuring mass flow of fluid materials such as liquids, gas and fluid solid material wherein coriolis force is utilized as an indication of the mass flow. The flowmeter includes U-shaped tubes which are vibrated while a fluent material to be measured flows through the tubes. Means are included to measure the mass flow of the material flowing through the tubes responsive to the vibrating characteristic of the tubes as altered by coriolis forces acting on the tubes.

U.S. Pat. No. 2,865,201 to Roth discloses a mass flowmeter of the giroscopic type which includes an embodiment illustrated in FIG. 6 of that patent wherein the amplitude of the precession of the giroscopic flowmeter is measured to give an indication of the mass flow through the meter. It is generally recognized that precession in a giroscope is caused by coriolis force.

A patent to Sipin, U.S. Pat. No. 3,355,944, discloses measuring the amplitude of twist in a curved flow tube induced by coriolis force to determine the mass of material flowing through the meter.

A giroscopic/coriolis flowmeter developed by Micro Motion, Inc. of Boulder, Colo. is described at page 21 of the Dec. 19, 1977 volume of Chemical and Engineering News. The flowmeter includes a U-shaped pipe with a T-shaped leaf spring to form the legs of a tuning fork. The pipe is vibrated at its natural frequency and the angular deflection is measured with optical detectors.

The optical detectors are placed on the sides of the U-shaped pipe and are connected to an up-down counter such that when one side of the U-shaped pipe crosses the static plane, the counter counts down until the second side of the pipe crosses the static plane. In the following half cycle of the vibration of the U-shaped pipe, the up-down counter counts up during the interval between the passing of the first side and the second side of the U-shaped pipe crossing the static plane of the pipe. The mass flow rate is then a function of pipe geometry constants and the time interval determined by the up-down counter.

The invention of the present apparatus includes sensing means connected to two vibrating U-shaped tubes for sensing which side of the U-shaped tubes cross the static plane first, and timing means for timing the interval between the sides of the U-shaped tube passing through the static plane. The time intervals of successive half cycles of vibration are then combined based upon which side of the tube crossed the static plane first as determined by the mentioned sensing means.

The invention of the apparatus also includes peak vibration controlling means for controlling the peak amplitude of the vibration of the U-shaped tubes; proximity switching means within said sensing means for sensing when the sides of the tubes cross the static plane; and discriminator means for generating a pulse after the signal from the switching means reaches a predetermined level. This amplitude controlling means, switching means and discriminator means provide that the generated pulses from the discriminator means occurs after the output of the switching means is linear and holds the peak to peak amplitude of the tubes at a constant value during varying density of fluid for activating the switching at the same point of its operating characteristic curve.

Also disclosed is a means which compares with present time measurement with a set of a plurality of previous measurements for either rejecting or accepting the present time measurement depending upon whether the present time measurement falls within a given range of deviation from the mentioned previous plurality of measurements. Also included is a means for alternately selecting one value from a plurality of deviations for making the mentioned comparison.

BRIEF DESCRIPTION OF THE DRAWINGS

The drawings include the following:

FIG. 1 is a three-dimensional diagram of the flowmeter showing two U-shaped tubes, electromagnetic vibrator means, and sensor means;

FIG. 2 is a closeup illustration showing a preferred embodiment of the sensor means;

DESCRIPTION OF THE PREFERRED EMBODIMENT

Figure 3:
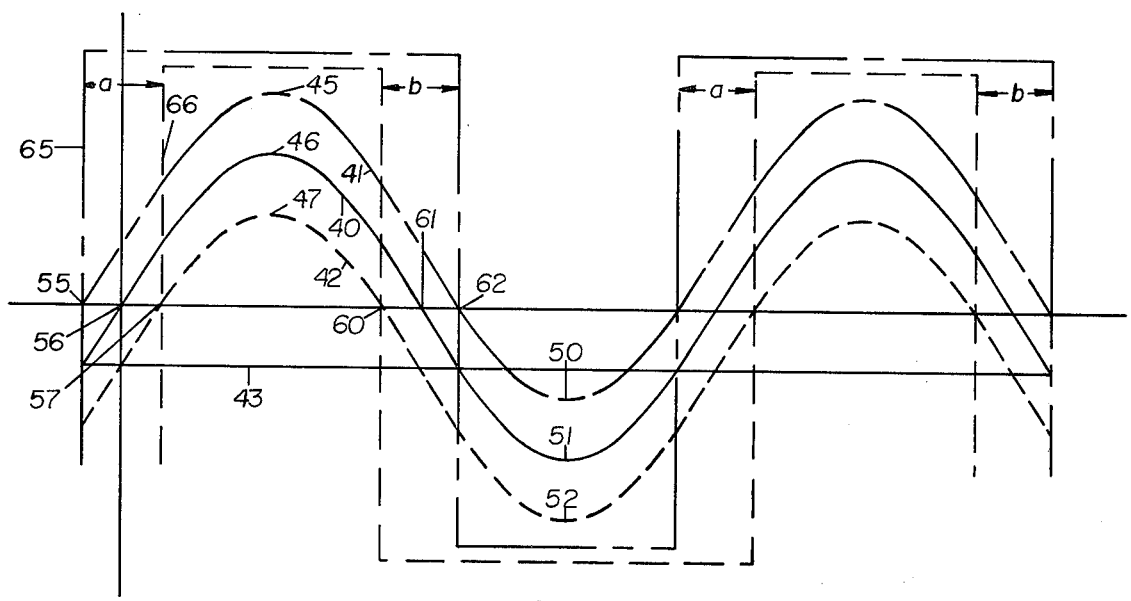
FIG. 3 is a diagram showing the displacement of the ends and the center of the cross member of one of the U-shaped tubes as the U-shaped tube is vibrated wherein the U-shaped tube has an initial twist and the meter has no flow therethrough.

The mass flowmeter of the present invention is shown in FIG. 1 and comprises a base 10 supporting an upper U-shaped loop 11 having side legs 12 and 13 and a cross member 14 which forms the bight end of the loop, and lower U-shaped loop 16 having side legs 17 and 18 and a cross member 19 forming the bight end of that loop.

A connecting flow tube 20 on the opposite side of base 10 from the loops 11 and 16 provides cross flow from the outlet of lower loop 16 to the inlet of upper loop 11 through the base 10. A meter inlet 21 is provided through support 10 to the inlet of lower tube 16 and a meter outlet 22 is provided through the support 10 to the outlet of upper tube 11.

A right sensor means R is provided between the upper loop 11 and the lower loop 16 on the righthand legs 12 and 17 as one faces the support 10 from the bight ends 14 and 19 of the loops 11 and 16.

The right sensor R includes a flag 23 connected to the lower loop 16 and an interrupter module 24 connected to the upper loop 11.

A left sensor means L is provided on the lefthand legs 13 and 18 between the upper loop 11 and the lower loop 16. The sensor means L includes a flag 25 connected to the lower loop 16 and an interrupter module 26 connected to the upper loop 11.

At the middle of cross members 14 and 19 is located vibrating means 30 for imparting up and down motions to the loops 11 and 16 normal to the planes of the loops. One of several vibrating means may be employed. For instance, a magnetic pole piece 31 may be connected to the center point of one of the cross members 19 and a current winding 32 may be connected to the center point of the other cross member 14 for alternately attracting and repelling the pole piece 31 to cause the mentioned vibrations.

Other means may be employed which would move the center points of the cross members 14 and 19 in one direction while relying on the stored energy in the loops for providing the motion in the opposite direction.

Also included in vibrating means 30 is a sense coil 33, to be discussed later.

The inlet and outlet ends of the loops 11 and 16 are firmly fixed in support 10 such that the loops act as the tines of a tuning fork which when struck assist each other by sympathetic vibrations thus decreasing the power requirements of vibrating means 30 to maintain the loops in vibration.

A sensor means 35 such as a flag and interrupter module, similar to those of sensors R and L, is used for sensing the amplitude of the vibrations caused by vibration means 30. Other means such as those known in the art may be used to sense the amplitude of vibrations between loops 11 and 16.

The design of the side legs 12, 13 and side 17, 18 as disclosed in copending application Ser. No. 804,478 assigned to the assignee of the present invention may be used in the present invention. However, the invention of the present application may also be used with straight sided loops.

FIG. 2 is a representation of the sensor means used for right sensor R and left sensor L, and which may be used for the amplitude sensor 35. By way of example, the lower blade portion 27 of flag 25 is shown in the interrupter module 26 of the left sensor L. The interrupter module 26 includes two projecting arm portions 28 and 29 which form a saddle. The blade portion 27 is aligned to fit between the arms 28 and 29 and to move freely up and down without touching the interrupter module body 26. One of the arms contains a light source while the other arm contains a light sensor such as a phototransistor. When blade portion 27 is fully inserted in the saddle between arms 28 and 29, the light beam is interrupted to turn the interrupter module to, for instance, the off position. When blade 27 is sufficiently removed from between the saddle formed by the arms 28 and 29, the light beam again strikes the light sensor to turn the switch to the on position. Thus, the sensor means is used as a proximity switch which turns from the off to the on condition when the blade portion 27 reaches a predetermined position. This invention may be used with other proximity type detectors which are capable of indicating when the side legs of the loops 11 and 16 have reached predetermined positions.

Suitable interrupter modules may be acquired from a number of sources such as, for instance, General Electric Company under the designation of H13A1.

FIG. 3 illustrates the waveforms exhibited by the cross member 14 of upper loop 11. A similar set of waveforms may be developed for lower loop 16. FIGS. 4, 5, 6 and 7 illustrate the orientation of the cross member 14 as the upper loop is vibrated between its uppermost excursion and its lowermost excursion.

Figure 4:
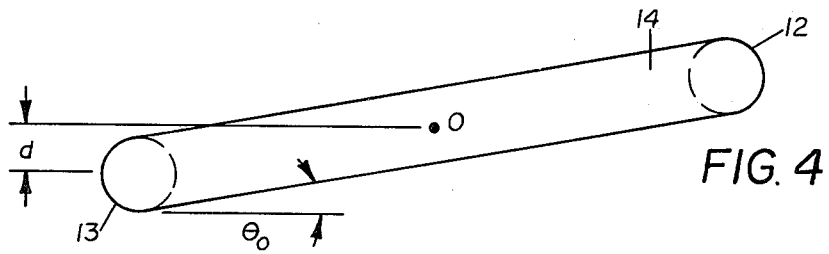
FIG. 4 shows the cross member of the loop of FIG. 3 at its highest point of excursion due to the vibrator means.

FIG. 4 illustrates cross member 14 and the connected side legs 12 and 13 when the cross member 14 is at the upper limits of its excursion. Since in a practical device it is impossible to orient the cross member 14 so it is perfectly level, an initial twist has been illustrated at an exaggerated angle $\theta_0$ for clarity. This angle $\theta_0$ results in the left side of cross member 14 being lower than the centerpoint 0 when there is no flow through the tubes 11 and 16 as shown in FIG. 4.

The preferred embodiment and the waveforms and equations herein have been developed assuming that the right sensor R is in the on position when the loops 11 and 16 are at rest. This may be accomplished for instance by assuming that the right leg 12 of the upper loop 11 is slightly higher than the left leg 13. This is referred to herein as a right cant to the loop. In a practical device this may be accomplished by calibrating the right sensor R to be on and the left sensor L to be in the off condition when the loops are at rest. Such a calibration similates the condition shown in FIG. 4 wherein the left side of cross member 14 is lower than the centerpoint 0 by the distance "d" when there is no flow through the meter.

Figure 5:
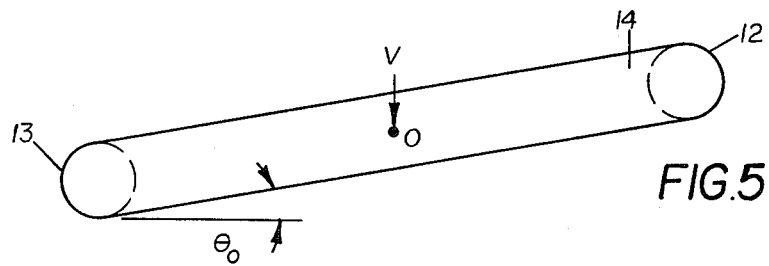
FIG. 5 shows the cross member of the U-shaped tube of FIG. 3 when the cross member is moving in the downward direction and just prior to the left end of the U-shaped tube crossing the static plane of the tube.

FIG. 5 illustrates the cross member 14 when it is moving downwardly and assumes that the left leg 13 is passing through the static plane of the tube 11. Thus, in FIG. 5 the left sensor L is at the instant when it is changing from the on condition to the off condition, and the right sensor R is still in the on condition.

Figure 6:
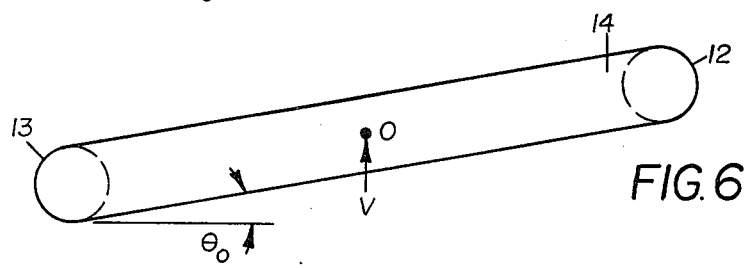
FIG. 6 shows the cross member of the U-shaped tube of FIG. 3 when the U-shaped tube is moving in the upward direction and just prior to the right side of the U-shaped tube crossing the static plane of the tube.

The cross member 14 in FIG. 6 is assumed to be moving in the up direction and is shown at the instant when the right leg 12 is passing through the plane of the loop 11 when loop 11 is at rest. At the instant illustrated in FIG. 6 the right sensor R is being switched from the off condition to the on condition, and the left sensor L is in the off condition.

Figure 7:
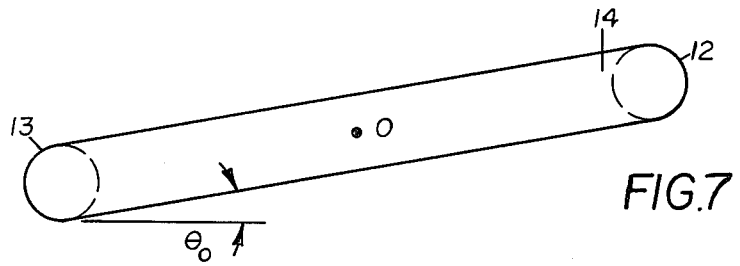
FIG. 7 shows the cross member of the U-shaped tube of FIG. 3 at its lowest point of excursion due to the vibrator means.

The cross member 14 in FIG. 7 is illustrated as it would appear at the lowermost excursion of the vibrations of loop 11. At this instant the loop is changing from a down direction to an up direction and at the lowermost limits of its excursion the tube is actually at rest.

In all the FIGS. 4, 5, 6 and 7 there is no flow of material through the loops 12 and 13, thus there is no coriolis force acting on the tube to twist the cross member 14 about the centerpoint 0 and thus the angle of cross member 14 remains constant throughout the vibrations as shown in FIGS. 4, 5, 6 and 7.

In FIG. 3 the offset distance from the static plane of loop 11 to centerpoint 0 caused by the oscillatory motion of centerpoint 0 is illustrated as a sine wave 40. The offset distance caused by the oscillatory motion of the end of cross member 14 where the cross member 14 joins the left leg 13 is illustrated as sine wave 41. Likewise, the offset distance of the point where the cross member 14 joins right leg 12 is shown as sine wave 42. The initial offset distance "d" with respect to the left side of cross member 14 caused by the right cant of cross member 14 is shown as a negative constant 43 in FIG. 3.

It can be seen that the motion of the left end of cross member 14 is the sum of sine wave 40 and the negative offset constant 43 shown as waveform 42 in FIG. 3. The motion of the right end of cross member 14 is initially offset by a similar distance from the right side of the cross member 14 to its centerpoint 0, and may be seen in FIG. 3 to be equal to the difference between the sine wave 40 and the negative constant 43 and shown as waveform 41 in FIG. 3.

When the cross member 14 is at the upper end of its excursions as shown in FIG. 4, the right end of cross member 14 will be at its highest peak shown at 45 of waveform 41, the centerpoint 0 of the cross member 14 will be at its highest point shown at 46 of waveform 40, and the left end of cross member 14 will be at its highest peak shown at 47 of waveform 42.

When the cross member 14 is at the lower extremity of its excursions as shown in FIG. 7, the right end will be at its lowest point shown at 50 of waveform 41, the centerpoint 0 of cross member 14 will be at 51, and the left end of cross member 14 will be at 52.

As can be seen from FIG. 3 and from FIGS. 4 and 7, when cross member 14 is at the upper limits of its excursion, the waveforms 40, 41 and 42 will be at the peaks of their positive cycles, and the right end will be at a higher peak at 45 than the left end which is at 47.

When the cross member 14 is at its lower excursion, the waveforms 40, 41 and 42 will be at their negative peaks, and the left end will be at a lower position 52 than will the right end which is at 50.

When the cross member 14 is moving upwardly as shown in FIG. 6 the right end of cross member 14 will cross the zero axis first as shown at 55. Shortly afterward, the centerpoint 0 will cross the static plane shown as the zero axis as illustrated at 56. As the cross member 14 continues to move upwardly, the left end of the cross member 14 will cross the zero axis last as illustrated at 57.

When the cross member 14 is moving downwardly as shown in FIG. 5, the left end will cross the zero axis at 60 followed shortly by the centerpoint 0 which crosses the zero axis at 61, which is then followed by the right end at 62.

When there is no flow through the flowmeter, the time between points 55 and 57, designated as "a" in FIG. 3, will be equal to the time between points 60 and 62, designated as "b" in FIG. 3.

A square wave 65 is shown in FIG. 3 showing the condition of right sensor R. Right sensor R is in the on condition when the right side of cross member 14 crosses the zero axis in the positive direction, and stays on until the right side of cross member 14 crosses the zero axis at the end of its positive half cycle. R is then in the off condition while the right side of cross member 14 is in its negative half cycle.

A square wave 66 likewise shows the condition of the left sensor L which is turned to the on condition when the left side of cross member 14 crosses the zero axis, and stays on during the positive half cycle of the wave 47. L then moves to the off condition at 60 when the left side of cross member 14 crosses the zero axis, and stays off while wave 42 is in its negative half cycle. Thus time "a" may be measured by observing the times between the arrival of the positive edges of square waves 65 and 66, and the time "b" may be measured by observing the arrival of the trailing edges of square waves 65 and 66.

It will be observed that when there is no flow in loops 11 and 16 time "a" will equal time "b."

Figure 8:
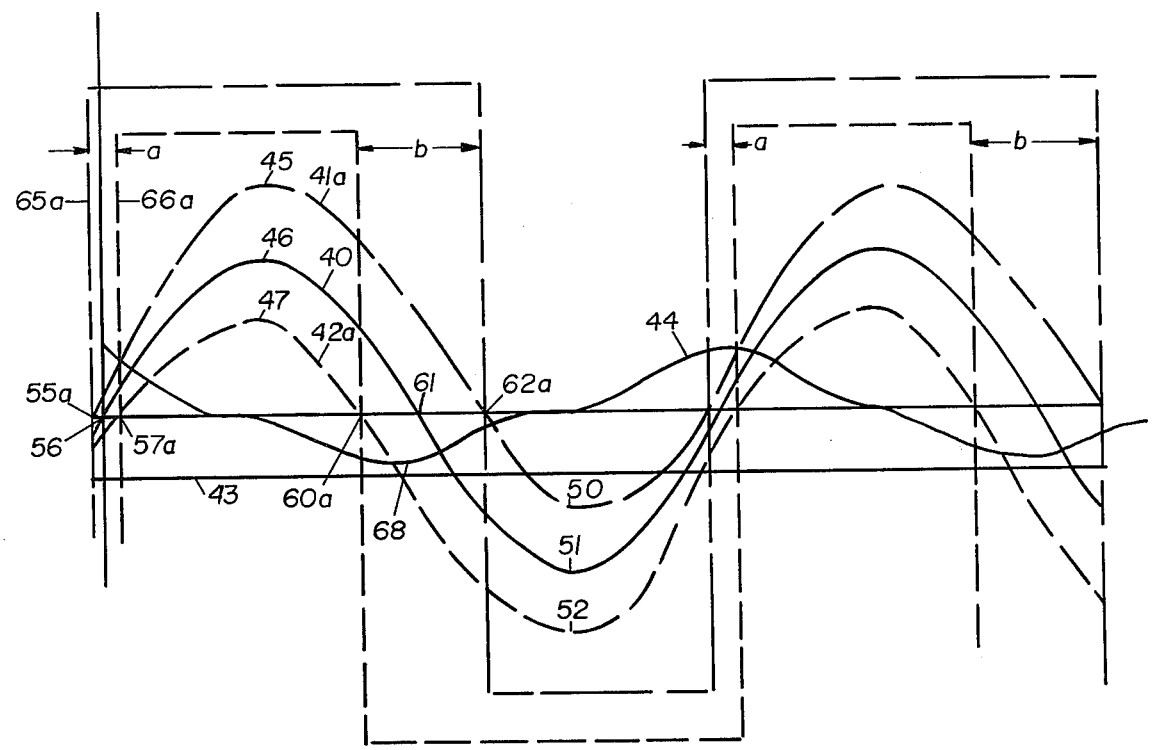
FIG. 8 shows the waveforms of the displacement of the end and middle of the cross member of one of the U-shaped tubes during vibrating motions wherein the tube has an initial offset and a mass flow therethrough causing coriolis forces having peaks less than the initial offset.

FIG. 8 displays the waveforms of cross member 14 when there is flow in the loops 11 and 16 such that the force couple $F_c$ and $F_c'$ created by the coriolis force causes the left sensor L to turn on earlier with increasing flow. The offset angle $\theta_0$ is assumed to be the same with cross member 14 having an initial right cant.

Figure 9:
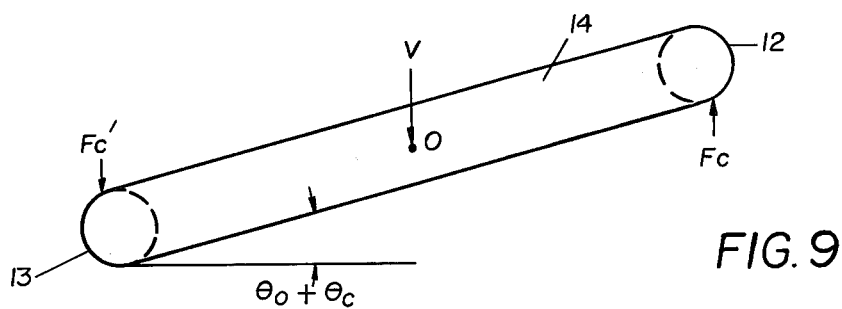
FIG. 9 shows the cross member of the U-shaped tube of FIG. 8 when the U-shaped tube is moving in the downward direction and just prior to the left side of the U-shaped tube crossing the static plane of the tube.

FIG. 9 illustrates the cross member 14 when the right side of the cross member is passing through the zero axis 55a in FIG. 8. At this position the angle $\theta_c$ caused by the coriolis force is in a positive direction and adds to the initial offset angle $\theta_0$. The oscillatory offset of centerpoint 0 of cross member 14 is unaffected by the coriolis force and is illustrated as sine wave 40 which is identical to the sine wave 40 shown in FIG. 3. The negative initial offset distance "d" is shown as a negative constant 43 as before. The coriolis force offset of force $F_c$ for the left side of tube 13 is shown as a generally cosine shaped wave 44 and has a negative peak 68 which is slightly less than the negative constant 43. The amplitude of the coriolis force at any instant of time may be calculated from the known equation:

$$\overline{F_c'} = -2M\,\overline{W} \times \overline{V}$$

where: $\overline{F}$ is the vectorial coriolis force acting on, for instance, the left leg 13 of the loop 11 of the flowmeter in FIG. 1 and designated $F_c'$ in FIGS. 9, 10, 12 and 13;

M is the mass of the material flowing through the left leg 13;

$\overline{W}$ is the vectorial angular velocity of the leg 13; and $\overline{V}$ is the vectorial velocity of the flow of the material through leg 13.

The exact wave shape of the left side coriolis force $F_c'$ is unknown, but is believed to have a maximum peak 68 which occurs some time slightly earlier than when the centerpoint 0 of cross member 14 crosses the zero axis at 61. This is believed to occur because, during the downward travel of cross member 14, the coriolis force $F_c'$ on left leg 13 will cause a twist in the cross member 14 which will induce a velocity component in the left side of member 14. This induced velocity component will act as positive feedback which in turn increases the coriolis force $F_c'$ on the left end of cross member 14.

It is believed that the coriolis force $F_c$ on the right side 14 will act as negative feedback when the cross member 14 is moving downwardly to cause the peak of the right side coriolis force $F_c$ to peak slightly after the centerpoint 0 crosses the zero axis.

Similarly, when the cross member 14 is moving upwardly from the negative peak 51 to the following positive peak, it is believed that the described coriolis force components act as a positive feedback on the right leg 12 and a negative feedback on left leg 13 respectively.

Figure 11:
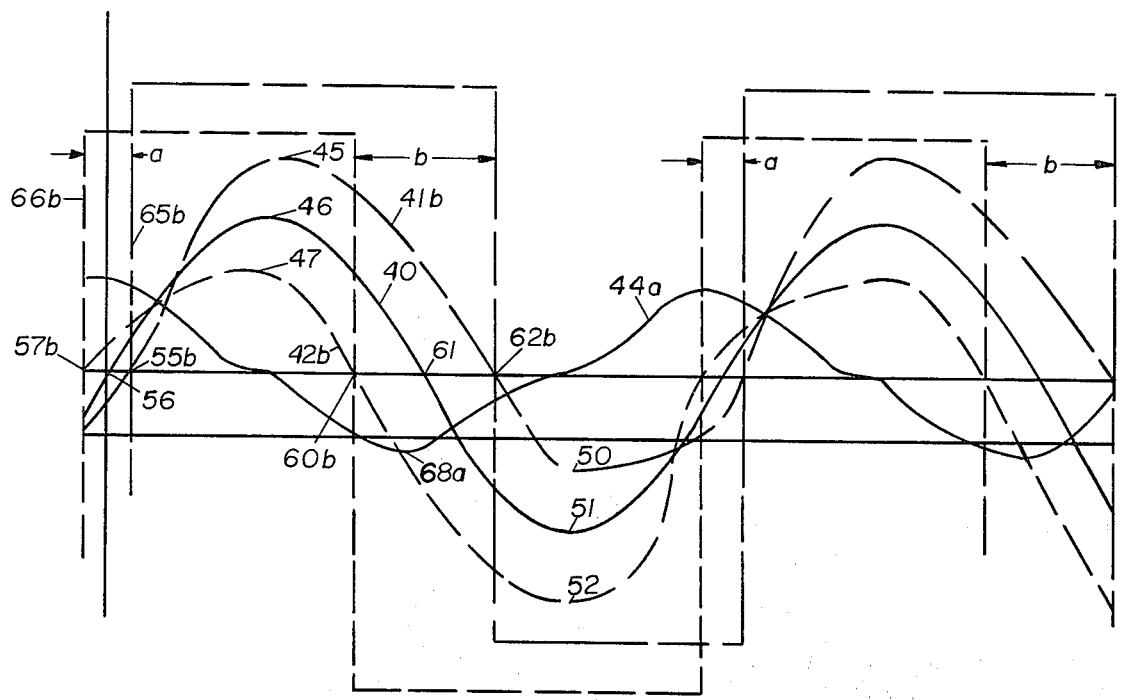
FIG. 11 shows the waveforms of the displacement of the ends and the center of the cross member of one of the U-shaped tubes of the invention wherein the tube has an offset and a flow therethrough causing coriolis forces having peaks in excess of the initial offset.

The exact waveform of the displacement of the left end and the right end of cross member 14 due to coriolis forces alone is not known, but it is believed that the waveform for the right end to be that shown as 41a and 41b in FIGS. 8 and 11 respectively, and the waveform for the left end to be that shown as 42a and 42b in FIGS. 8 and 11 respectively.

It is believed that the peaks 45 and 50 for the right end of 14 will occur at about the same time as peaks 46 and 51 for the centerpoint 0 in both of the conditions described in connection with FIGS. 8 and 11. It is believed that the peaks 47 and 52 for the left end of 14 also occur at about the same time as the peaks 46 and 51 for centerpoint 0 in connection with FIGS. 8 and 11.

It is known that the zero crossings 55a and 62a of the right side 12 are related to the zero crossings 57a and 60a of the left side 13 as shown in FIG. 8; and that the zero crossings 55b and 62b of the right side 12 are related to the zero crossings 57b and 60b of the left side 13 as shown in FIG. 11. It is also known that the movement of the ends of cross member 14 will additionally be affected by other forces, such as for instance inertial forces, not shown in FIG. 8 or 11. It will be understood that inertial forces of the tubes and the material in the tubes due to the vibrations 56 will be at a minimum at the zero crossings such as 56 and 61 of FIGS. 8 and 11. However, the inertial forces of the tubes and the material in the tubes due to the back and forth twist of member 14 caused by coriolis forces $F_c$ and $F_c'$ will be maximum at or near the time the ends of the member 14 go through the zero axis.

Thus, by measuring the time difference between the passing of the sides of the loops 11 and 16 through the zero axis, and utilizing the present invention for sensing which side of the tube went through the zero axis first, it is possible to determine the mass flow of material flowing through the meter without relating the amplitude of deflection of the tubes back to the complex forces causing the deflection.

Figure 10:
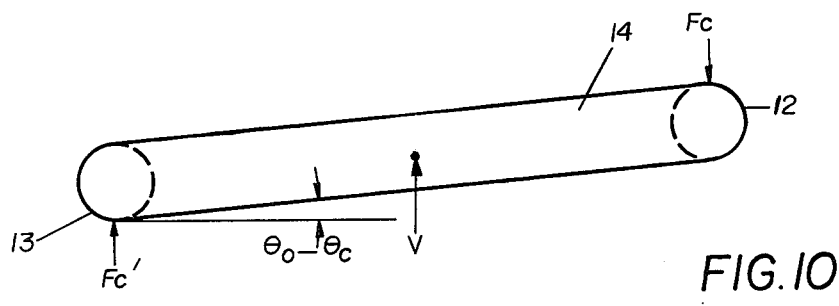
FIG. 10 shows the cross member of the U-shaped tube of FIG. 8 when the U-shaped tube is moving in the upward direction and just prior to the right end of the cross member crossing the static plane of the tube.

FIG. 10 illustrates cross member 14 when cross member 14 is moving in the upward direction. The force couple $F_c$ and $F_c'$ is working against the initial offset and $\theta_0$. The angle $\theta_c$ caused by this force couple is subtracted from the offset angle $\theta_0$ in FIG. 10 to show the deflection as cross member 14 starts through the static plane of the tube 11. As can be seen from FIGS. 8 and 10, the right side of cross member 14 crosses the zero axis first at 55a, the centerpoint 0 crosses slightly later at 56, which is followed by the left side of cross member 14 at 57a. As the velocity of cross member 14 slows to a positive peak the coriolis force couple $F_c$ and $F_c'$ decreases until at the peak points 45, 46 and 47 the orientation of cross member 14 due to coriolis deflection alone is believed to be that shown in FIG. 4.

When the cross member 14 starts moving in the downward direction illustrated in FIG. 9, the coriolis force couple $F_c$ and $F_c'$ assists the initial offset angle $\theta_0$ such that the angle $\theta_c$ caused by the coriolis force couple is added to the offset angle $\theta_0$ in FIG. 9 showing the orientation of cross member 14 just prior to cross member 14 crossing the static plane of tube 11. As illustrated in FIG. 9, the left side of cross member 14 crosses the zero axis first at 60a, followed by the centerpoint 0 of cross member 14 at 61. Finally, the right side of cross member 14 crosses the zero axis at 62a.

As shown in FIG. 8, the curve 41a of the left side of cross member 14 is the sum of sine wave 40, showing the offset of centerpoint 0, generally cosine shaped wave 44 showing the offset caused by coriolis force $F_c'$, and negative offset 43 showing the initial offset distance "d" of the left side of 14. The waveform 41a of the right side of cross member 14 is similarly affected by an initial offset distance and a deflection caused by the coriolis force $F_c$. The components of waveform 41a are not shown in FIGS. 8 or 11 for clarity.

The leading edge of square wave 65a indicates when the right side of cross member 14 crosses the zero axis, and the leading edge of square wave 66a indicates when the left side of cross member 14 crosses the zero axis. The time difference between the leading edges of square waves 65a and 66a is indicated by time "a."

As illustrated in FIG. 9, the left side of cross member 14 crosses the centerpoint at 60a first as shown by the trailing edge of square wave 66a. The right side of cross member 14 crosses the zero axis last as shown by the trailing edge of wave 65a. The difference between the trailing edge of square wave 66a and the trailing edge of square wave 65a can be measured as time "b."

It can be seen from FIG. 8 that time "b" is larger than time "a." In effect, the square wave 66a has moved to the left with respect to square wave 65a inside square wave 65a from that position shown by waves 56 and 66 in FIG. 3. The subtraction of time "a" from time "b" results in a time that is twice the value of the times between passing of the right and left legs if there were no initial offset.

The difference between the passing of the side legs of the loops in the flowmeter is directly proportional to the mass flow of the material flowing through the loops. If the peaks 45, 46 and 47 of the waves 40, 41a and 42a were increased, the zero crossings 55a, 56 and 57a would remain the same. However, the slopes of the waves 40, 41a and 42a would increase at the zero crossings to indicate that the displacement of the centerpoint 0 and the ends of the cross member 14 would be changed at any instant of time with the change of the peaks 45, 46 and 47.

This can be understood physically by looking, for instance, at FIG. 9. If the velocity V of the centerpoint 0 is increased, the coriolis force couple would increase to increase $\theta_c$. This increased angle would cause the left side of cross member 14 to move downwardly to have a greater displacement from centerpoint 0 in a down direction. However, the twist about centerpoint 0 caused by the coriolis force couple would cause the right side to move upwardly to have a positive displacement from centerpoint 0. Centerpoint 0 would be moving downwardly at a higher velocity but the left side would arrive at the zero crossing earlier to thus cancel the effect of the increased velocity. The time of arrivals between the left side and the centerpoint 0 would be equal on a time basis. Likewise, the right side of the cross member 14 would be moved upwardly such that the increased velocity would be offset by the greater displacement between the centerpoint 0 and the right side of cross member 14. Thus on a time basis, the time of passing of the left side of cross member 14 and the right side would remain the same even if the amplitude of the vibratory motion of cross member 14 were increased or the natural frequency of vibration changed.

It can thus be seen that in both FIG. 3 and in FIG. 8 the correct answer for calculating the coriolis force couple can be arrived at by subtracting time "a" from time "b." This relationship always remains true as long as the leading edge of the square wave from the right sensor R leads the leading edge of the square wave from the left sensor L.

FIG. 11 illustrates the waveforms present when the coriolis force $F_c'$ has a negative peak 68a which is greater than the negative offset 43. This situation is illustrated in FIG. 12 when the cross member 14 is moving in the down direction, and in FIG. 13 when the cross member 14 is moving in the up direction.

Figure 13:
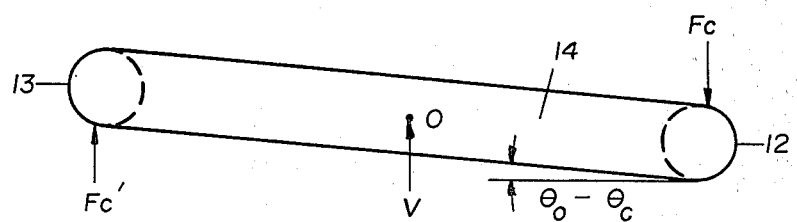
FIG. 13 shows the cross member of the loop of FIG. 11 when the cross member is moving in the upward direction and just prior to the left side of the cross member crossing the static plane of the tube.

FIG. 13 illustrates the cross member 14 just prior to the left side passing through the zero axis as shown at 57b in FIG. 11. The angle $\theta_c$ caused by the coriolis force couple is greater than the offset angle $\theta_0$ so that the difference in the two angles causes the left side of cross member 14 to slightly lead the centerpoint 0 of the cross member 14. Because of this twist, the right side of cross member 14 will slightly lag behind the left side as shown at 55b. This means that the leading edge of the square wave 66b caused by turning on the left sensor L will lead the leading edge of square wave 65b caused by turning on right sensor R.

Since the coriolis force will return to zero when the cross member 14 is at its maximum positive displacement where its angular velocity is zero, it is believed the peaks 45, 46 and 47 due to coriolis displacement alone occur at about the same time in FIG. 11 as in FIG. 3. Cross member 14 when at its peak of excursion in the upward direction, and without forces other than coriolis forces being present is illustrated in FIG. 4. It is believed that without other forces being present, FIG. 7 illustrates the orientation of cross member 14 when it is at its lower peak of excursion with the right side at 50, its centerpoint 0 at 51, and its left side at 52.

Figure 12:
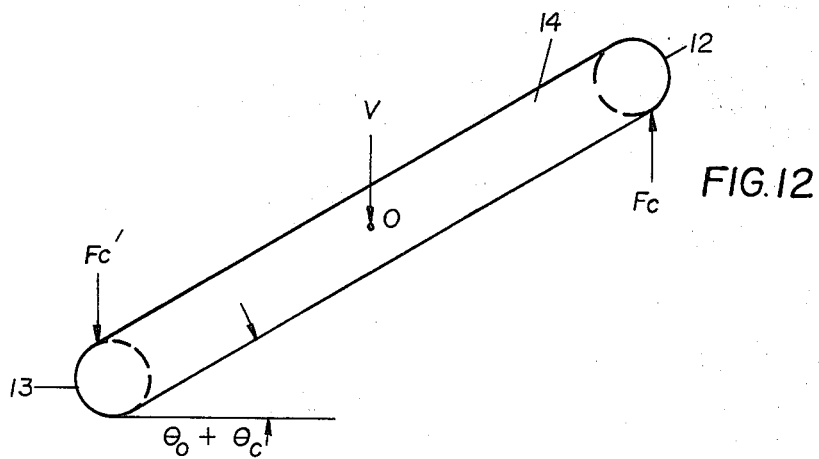
FIG. 12 shows the cross member of the loop of FIG. 11 when the cross member is moving in the downward direction and just prior to the left side of the cross member crossing the static plane of the tube.

When the cross member 14 is moving in the downward direction as shown in FIG. 12, the left side will cross the zero axis at 60b first, the centerpoint 0 will cross the zero axis next at 61, and the right side will cross the zero axis last at 62b. Thus it can be seen that when the peak 70a of the coriolis force $F_c'$ waveform 44a is greater than the initial offset distance "d" shown at 43, the leading edge of the square wave 66b caused by the left sensor L turning on will lead the leading edge of the square wave 65b caused by the turning on of the right sensor R.

The trailing edge of square wave 66b will lead the trailing edge of square wave 65b since when the loop 11 is moving downwardly, the offset angle $\theta_0$ is helped by the coriolis force couple $F_c$ and $F_c'$ to add the coriolis force angle $\theta_c$ to $\theta_0$. The left side will then lead the right side as the cross member 14 crosses the zero axis. In this situation the time "a" is added to the time "b" to determine the proper contribution to the twist of member 14 caused by the coriolis force couple exerted by the material flowing through the tubes of the loops 11 and 16.

Thus, when the flowmeter of the present invention is calibrated such that at rest the right sensor is turned on and the left sensor is turned off and the flow through the tubes is such that the left sensor turns on earlier with increasing flow, then a check may be made to determine whether the leading edges of the square wave to be first sensed is caused by the right sensor R or the left sensor L. If the leading edge of the first square wave to be sensed is caused by the right sensor R, then the time "a" is subtracted from the time "b" to give a value indicative of the mass flow of the material flowing through the meter. If however the first square wave sensed is caused by the left sensor L, then the time "a" is added to the time "b" to give a value which is indicative of the mass flow of the material flowing through the meter.

Similar diagrams for the orientation of the lower cross member 19 and waveforms of its motion may be developed by one skilled in the art. However, with the sensor interrupter modules connected to one loop, and the interrupting flags connected to the other loop, and with an initial offset calibrated into the device such that at rest the right sensor R is on and the left sensor L is off, the actual deviations of the cross member 14 and 19 is compensated for, and the study of FIGS. 3-13 is sufficient to understand the invention.

Figure 14:
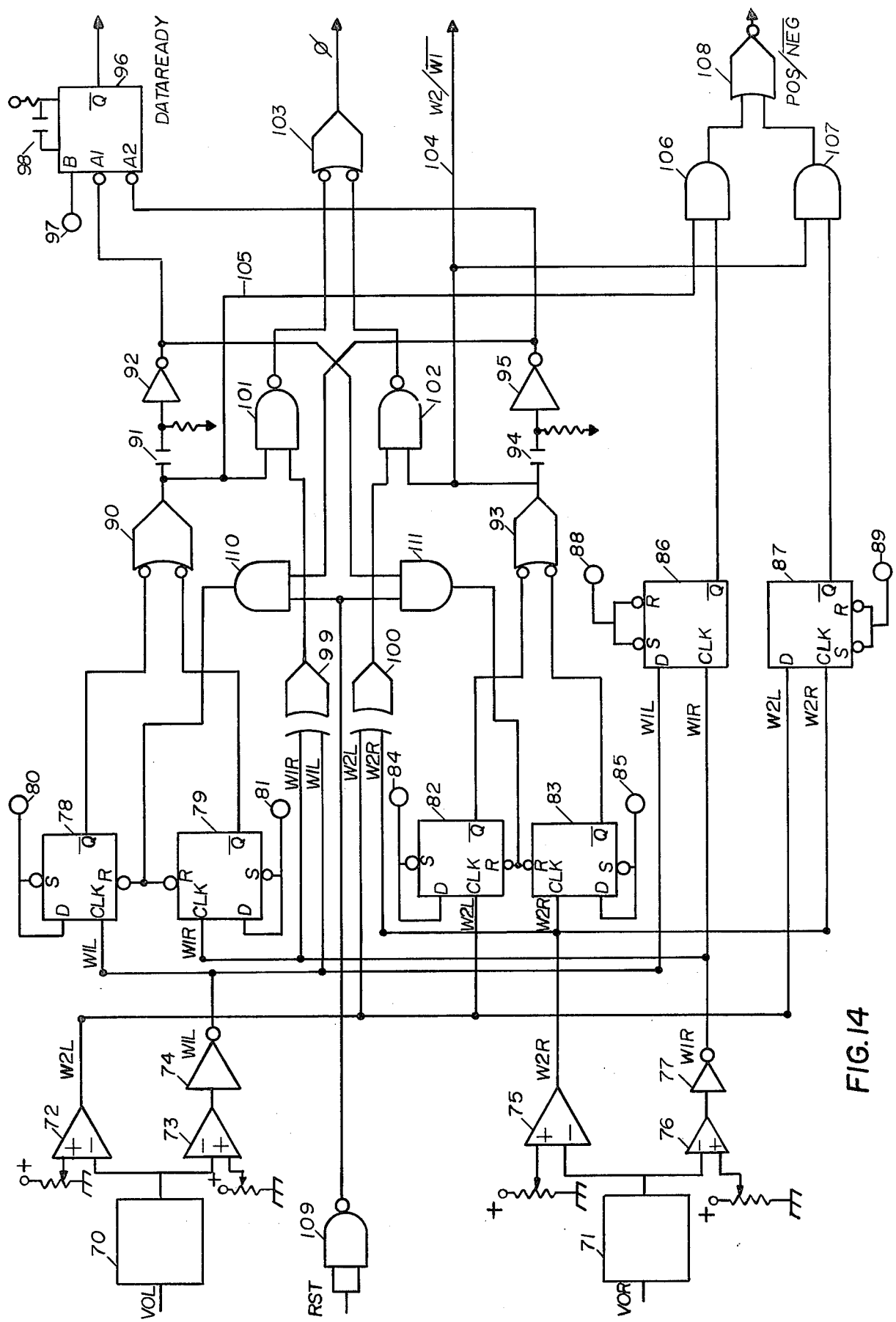
FIG. 14 is a schematic diagram of a preferred embodiment of means for sensing which side of the vibrating loops crosses the static plane of the loop first when the two loops are vibrating as a tuning fork.

The electronics for the zero correcting feature of the present invention is shown in schematic logic diagram FIG. 14. The output signal VOL of the left sensor L is input into a buffer circuit 70 which isolates the left sensor L. Likewise, the output VOR of the right sensor R is input into a buffer circuit 71. The output of buffer circuit 70 is provided to comparators 72 and 73 each of which acts to compare the output to a positive reference voltage to ensure that the output VOL has reached a linear portion of its curve before the comparator is switched. If the waveform of VOL is declining, the comparators 72 and 73 will switch to the positive condition when the output VOL falls below the predetermined reference voltage. In this case the comparators 72 and 73 are switched to give a logical zero output while the waveform of VOL is still in its linear portion of the curve when the waveform is falling due to the relative velocity between the interrupter module 26 and the blade 25 when the blade portion 27 is between the arms 28 and 29.

Comparators 72 and 73 act as inverters in that when VOL rises above a certain point, the output from comparators 72 and 73 will be a logical zero and when VOL falls below the reference voltage the output from comparators 72 and 73 will be a logical one.

The output of comparator 73 is supplied to an inverter 74 to provide a logical one when the output of comparator 73 is a logical zero and to provide a logical zero when the output of comparator 73 is a logical one. The output of comparator 72 is labeled W2L and the output of inverter 74 is labeled W1L.

The voltage W2L is used to determine window 2 while the voltage W1L is used to determine window 1. Window 1 refers to the leading edges of the waveforms WOL and WOR. Window 2 refers to the trailing edges of VOL and VOR. The determination of the mentioned windows 1 and 2 will be discussed later.

The output of buffer circuit 71 is supplied to comparators 75 and 76. Comparators 75 and 76 serve similar functions as comparators 72 and 73 in that they provide a logical zero when voltage VOR rises above a predetermined reference voltage, and provide a logical one when voltage VOR falls below the predetermined reference voltage.

The output of comparator 76 is connected to the input of an inverter 77 for providing a logical one when the output of comparator 76 is a logical zero and for providing a logical zero when the output of comparator 76 is a logical one.

The output of comparator 75 is labeled W2R and the output of inverter 77 is labeled W1R. W1R and W2R are used for the determination of window 1 and window 2 respectively.

The output of inverter 74 supplying W1L is connected to the clock of a D-type edge triggered flip flop 78, one input of an exclusive OR gate 99, and the D terminal of a D-type edge triggered flip flop 86.

The output of comparator 72 supplying W2L is connected to one input of an exclusive OR gate 100, the clock of a D-type edge triggered flip flop 82, and the D terminal of a D-type edge triggered flip flop 87.

The output of inverter 77 supplying W1R is connected to the clock of a D-type edge triggered flip flop 79, one input of exclusive OR gate 99, and the clock of D-type edge triggered flip flop 86.

The output of comparator 75 supplying W2R is connected to one input of exclusive OR gate 100, the clock of D-type edge triggered flip flop 83, and the clock of D-type edge triggered flip flop 87.

The set terminals, sometimes referred to as the preset terminal, and the D terminals of flip flops 78, 79, 82 and 83 are connected to a logical one through terminals 80, 81, 84 and 85. The reset terminals, sometimes referred to as the clear terminal, of flip flops 78 and 79 are connected together and the reset terminals of flip flops 82 and 83 are tied together and are connected to the AND gates 110 and 111 respectively, whose function will be referred to later.

The set and reset terminals of flip flop 86 are tied together and connected to a logical one through terminal 88. Likewise, the set and reset terminals of flip flop 87 are tied together and are supplied a logical one through terminal 89.

Flip flops 78 and 79, flip flops 82 and 83, and flip flops 86 and 87 are grouped together and are dual D-type edge triggered flip flops preferably such as SN 7474. These flip flops transfer input information to the outputs on the positive edge of the clock pulse. Thus, if the D terminal has a logical one at the arrival of the positive edge of the clock pulse, a logical zero is transferred to the $\bar{Q}$ output. A low input to the reset terminal of a D-type edge triggered flip flop resets the $\bar{Q}$ output to a logical one. The reset function is independent of the clock terminal.

The $\bar{Q}$ outputs of flip flops 78 and 79 are supplied to the input terminals of NAND gate 90. The output of NAND gate 90 is supplied to an RC circuit 91 which is in turn connected to the input of inverter 92. The output of inverter 92 is connected to the A1 terminal of a one shot device 96 and to one of the inputs of AND gate 111. When the output of NAND gate 90 goes high, the RC circuit 91 produces a positive pulse which, when inverted by inverter 92, has sufficient amplitude and duration to fire the one shot device 96. This output pulse from inverter 92 is also supplied to one input of AND gate 111 which in turn causes the output of AND gate 111 to go low to reset flip flops 82 and 83.

The $\bar{Q}$ outputs of gates 82 and 83 are connected to the inputs of NAND gate 93 whose output is connected to RC circuit 94. The output of RC circuit 94 is in turn connected to the input of inverter 95. The output of inverter 95 is connected to the A2 terminal of one shot device 96 and to one of the input terminals of AND gate 110. A positive going pulse produced by RC circuit 94 is inverted by inverter 95 and has sufficient amplitude and duration to fire one shot device 96 and to cause the output of AND gate 110 to go low thereby resetting flip flops 78 and 79.

The other inputs to AND gates 110 and 111 are supplied by the output of NAND gate 109 which is connected to act as an inverter for a reset signal supplied to its inputs. The reset signal, labeled RST in FIG. 14 is normally a logical zero. This logical zero is inverted by NAND gate 109 to be a logical one which is supplied to AND gates 110 and 111.

The outputs from inverters 92 and 95 will normally be logical ones. If a positive going pulse is produced by RC circuit 91, it is inverted by inverter 92 to a negative going pulse which applies a logical zero to AND gate 111. The logical one and logical zero at the inputs of AND gate 111 causes logical zero at the output of AND gate 111 which acts to reset the $\bar{Q}$ output of flip flops 82 and 83 to a logical one. Likewise, if a positive going pulse is produced by RC circuit 94, the output of inverter 95 produces a logical zero for the duration of the pulse and applies a logical zero to AND gate 110. The logical one and logical zero inputs to AND gate 110 causes the output of AND gate 110 to supply a logical zero to the resets of flip flops 78 and 79 to cause the $\bar{Q}$ outputs of 78 and 79 to go to a logical one.

The output of exclusive OR gate 99 is supplied to one input of NAND gate 101, and the other input of NAND gate 101 is connected to the output of NAND gate 90. Similarly, one input to NAND gate 102 is connected to the output of exclusive OR gate 100 and the other input of NAND gate 102 is connected to the outut of NAND gate 93.

The output of NAND gates 101 and 102 are supplied to the inputs of NAND gate 103. The output of NAND gate 103 is the $\phi$ signal provided to a microprocessor of the preferred device.

The output of NAND gate 93 is connected to conductor 104 which supplies the W2/$\overline{W1}$ output for use by the microprocessor of the preferred device. The W2/$\overline{W1}$ signal is in a high condition during the falling edges of VOL or VOR and is referred to herein as window 2. The W2/$\overline{W1}$ signal is in a low condition during the rising edge of VOL or VOR and is referred to herein as window 1.

One of the input terminals of AND gate 107 is connected to conductor 104 and thus to the output of NAND gate 93, and the other input of AND gate 107 is connected to the $\bar{Q}$ terminal of flip flop 87. Similarly, one input of the AND gate 106 is connected to the output of NAND gate 90 by conductor 105, and the other input of AND gate 106 is connected to the $\bar{Q}$ terminal of the flip flop 86. The output of AND gates 106 and 107 are connected to the inputs of NOR gate 108. The output of NOR gate 108 provides the POS/$\overline{\text{NEG}}$ output.

The POS/$\overline{\text{NEG}}$ output is in the high condition when, for instance, time "a" should be added to time "b" as illustrated and discussed in connection with FIGS. 3 and 8. The POS/$\overline{\text{NEG}}$ signal is in the low condition when, for instance, the time difference between the leading edges of waveforms VOL and VOR should be negative such as a case illustrated in FIG. 11 when time interval "a" should be subtracted from time interval "b." Exceptions may be made to the polarity of the POS/NEG signal in the case of reverse flow, which case will be discussed later.

Flip flops 78 and 79 determine the first leading edge of either VOL or VOR.

Flip flops 82 and 83 sense the first occurrence of the trailing edge of either of the voltage waves VOL or VOR. Exclusive OR gates 99 and 100 detect the time difference between the rising edges of VOL and VOR, and the falling edges of VOL and VOR. Flip flops 86 and 87 determine which of the rising or falling edges of the two waveforms VOL and VOR occurred first.

Figure 15:
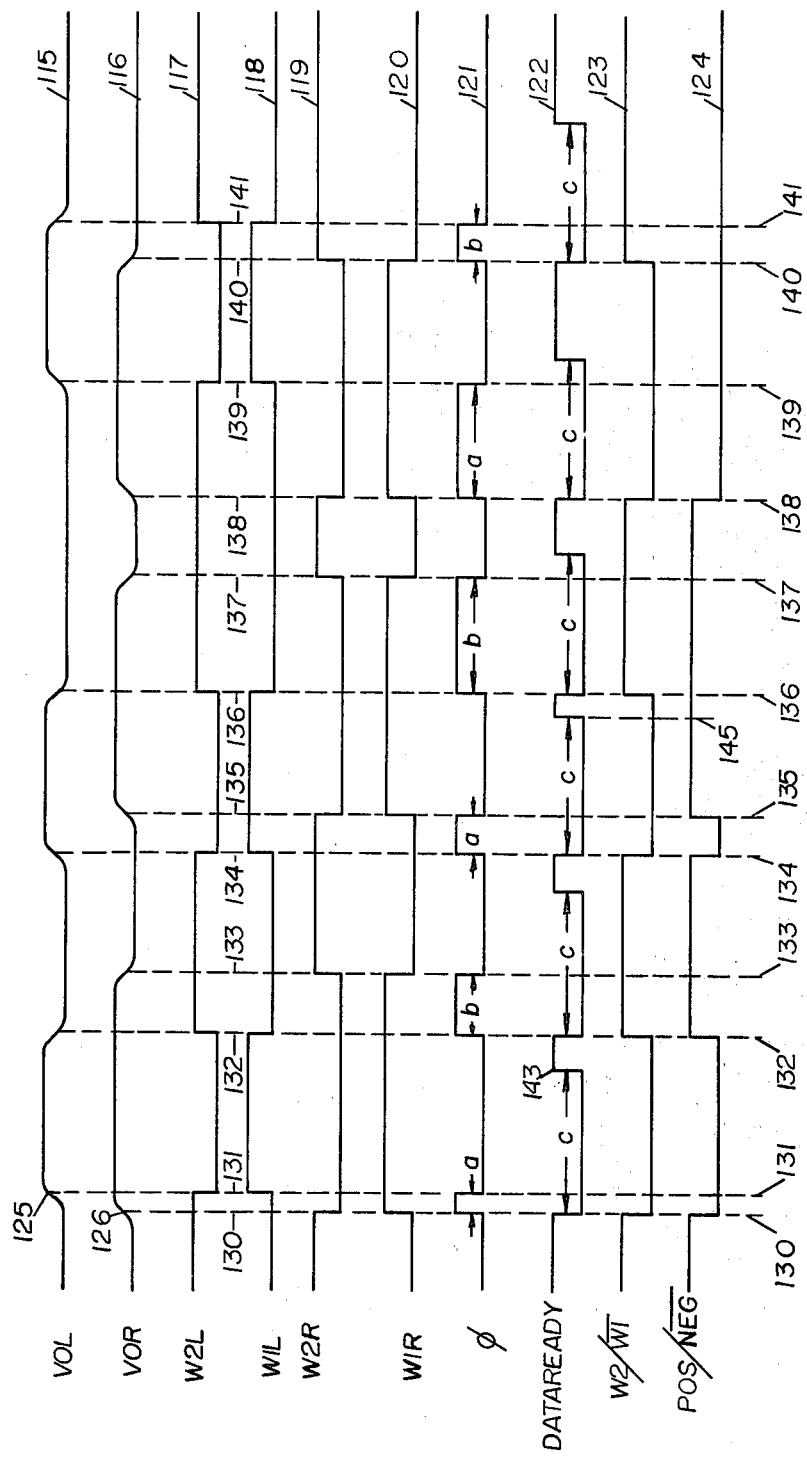
FIG. 15 is a timing diagram of various signals in the sensing means of FIG. 14.

FIG. 15 illustrates the timing diagram of various of the waveforms involved which illustrates the operation of the circuit of FIG. 14. At the beginning of each waveform of FIG. 15 it is assumed that both VOL and VOR are in the low position, that the $\bar{Q}$ outputs of flip flops 78 and 79 are in the high position having been reset by a previous waveform, the $\bar{Q}$ outputs of flip flops 82 and 83 are in the low position having been transferred there by logical one inputs from previous W2L and W2R waveforms, the $\bar{Q}$ output of flip flop 86 is in the high position and the $\bar{Q}$ output of flip flop 87 is in the low position having been transferred there by previous waveforms. These settings would result in a $\phi$ signal output which is low, a W2/$\overline{W1}$ output which is high, and a POS/$\overline{NEG}$ output which is high.

If the starting point were assumed to have occurred after the reset signal RST has been supplied to NAND gate 109, then the $\bar{Q}$ outputs of flip flops 78, 79, 82 and 83 would be moved to a logical one, and this would result in a change to the diagram wherein the W2/$\overline{W1}$ signal would be in the low condition.

If VOR turns on first as the case is illustrated in FIGS. 3 and 8, and illustrated in FIG. 15 at the intersection of VOR waveform 116 and the vertical line 130, the W2R voltage from comparator 75 would go from a high to a low as illustrated in the intersection of curve 119 and vertical line 130 in FIG. 15, and the voltage W1R from converter 77 would go from a low to a high as illustrated in FIG. 15 at the intersection of waveform 120 and vertical line 130.

The logical one input into the clock terminal of flip flop 79 by voltage W1R would cause the $\bar{Q}$ output of flip flop 79 to go low which when fed into the NAND gate 90 with the high from the $\bar{Q}$ output of flip flop 78 would cause the output from NAND gate 90 to go high. This high would cause a pulse to be produced by the RC circuit 91 which is inverted by inverter 92. This negative pulse would trigger the one shot device 96 to cause the DATAREADY signal output to go low as illustrated in the intersection of waveform 122 and vertical line 130 in FIG. 15. The time that one shot circuit 96 produces the negative pulse would be determined by the RC circuit 98. This time is illustrated by the width "c" of the negative pulses of waveform 122. The time "c" is designed to be sufficiently longer than the longest time between the crossings of the zero plane of the ends of cross member 14 in either the up or down direction as discussed in connection with FIGS. 3-13. This time "c" includes additional time such that the times "a" or "b" may be calculated in order that a representation of the time widths "a" or "b" may be supplied to a microprocessor of the preferred device when the DATAREADY signal 122 again goes to the high condition at the end of time "c."

The negative going pulse from inverter 92 is also supplied to AND gate 111 which in turn supplies a logical zero to reset terminals of flip flops 82 and 83 to move the $\bar{Q}$ outputs of the mentioned flip flops 82 and 83 to a logical one. These logical ones are supplied to NAND gate 93 which causes a low to be supplied to conductor 104 as illustrated by the W2/$\overline{W1}$ going low at the intersection of waveform 123 and vertical line 130 of FIG. 15.

W1R is a logical one and W1L is a logical zero which causes exclusive OR gate 99 to give a high output. W2L is a high and W2R is switched to the low condition which causes exclusive OR gate 100 to also give a high output. The output supplied by exclusive OR gate 99 and the high output supplied by the output of NAND gate 90 is fed to NAND gate 101 which produces a low output which is in turn supplied to NAND gate 103. The high output of exclusive OR gate 100 is supplied to the input of NAND gate 102 with the low output of NAND gate 93 thereby causing a high output from NAND gate 102 which in turn is supplied to the other input of NAND gate 103. These high and low inputs result in a high output being supplied by NAND gate 103 as illustrated by the $\phi$ output of the intersection of waveform 121 and vertical line 130.

The positive edge of wave W1R supplied to the clock of flip flop 86 and the low input to the D terminal caused by voltage W1L will cause a high output from the $\bar{Q}$ terminal of flip flop 86. This high output is supplied with the high output of NAND gate 90 to AND gate 106 to produce a high output from AND gate 106. The low output of NAND gate 73 and the low output of flip flop 87 is supplied to AND gate 107 which produces a low output. The high output of AND gate 106 and the low output of AND gate 107 are supplied to NOR gate 108 which causes the POS/$\overline{NEG}$ wave to go low as illustrated at the intersection of waveform 124 and vertical line 130 of FIG. 15.

When the leading edge of VOL is detected as illustrated at the intersection of waveform 115 and vertical line 131, the W2L output of comparator 72 goes low as illustrated by the intersection of waveform 117 and vertical line 131, and the W1L output of inverter 77 goes high as illustrated by the intersection of waveform 118 and vertical line 131.

The high voltage W1L is supplied to the clock of flip flop 78 as a logical one, and the positive leading edge causes the $\bar{Q}$ output of flip flop 79 to go low. This low is supplied to the input with the low from $\bar{Q}$ of flip flop 79 to NAND gate 90 to maintain the output of NAND gate 90 in a high condition. The W1L input to exclusive OR gate 99 goes to a high which, with the high input of W1R, causes the exclusive OR gate 99 to switch its output to a low. This low output is supplied to one input of NAND gate 101 with the high output of NAND gate 90 to the other input, to cause a high output from NAND gate 101 to be supplied to one of the inputs of NAND gate 103.

The low input of W2L supplied with the low input of W2R to exclusive OR gate 100 causes the output of OR gate 100 to be changed to a low condition which is supplied to one input of NAND gate 102 with the low from the output of NAND gate 93 to the other input. These two low inputs cause the output of NAND gate 102 to move to a high condition which is supplied to the other input of NAND gate 103.

The two high inputs of NAND gate 103 cause the $\phi$ signal to move to a low condition as illustrated at the intersection of waveform 121 and vertical line 131. The width of the pulse produced by $\phi$ signal 121 between vertical lines 130 and 131 is the time "a" illustrated in FIG. 8.

Since the inputs to the other elements are not operative waveforms, the other elements remain the same, and W2/$\overline{W1}$ signal 123 and POS/$\overline{NEG}$ signal 124 remain in the low condition at vertical line 131.

It will be noted that the W2/$\overline{W1}$ signal 123 is in its low condition to indicate that the waveforms VOL and VOR are in window 1 and that a leading edge is being processed. The POS/$\overline{NEG}$ signal 124 is also low which indicates that the pulse width "a" of the $\phi$ signal 121 between vertical lines 130 and 131 should have a negative value.

At the end of time "c" as determined by RC network 98, the $\overline{Q}$ output of flip flop 96 again does to a logical one as indicated by the waveform 122 moving to the positive condition at 143.

At vertical line 132, the VOL waveform 115 goes to a low to indicate the beginning of a trailing edge. When the VOL waveform 115 goes low, the W2L waveform 117 goes high and the W1L waveform 118 goes low as indicated at line 132. The high of W2L is supplied to the clock input of flip flop 82 to cause the $\overline{Q}$ output of flip flop 82 to go low. This low output is provided to NAND gate 93 with the high output of flip flop 83 to cause the output of NAND gate 93 to move to a high. This high output causes the W2/$\overline{W1}$ waveform 123 to move to a high condition. The high output of NAND gate 93 also causes a positive pulse output of RC circuit 94 which is inverted by inverter 95. This inverted signal is supplied to one shot device 96 to cause a negative pulse of time width "c" at the $\overline{Q}$ terminal of 96. The output of inverter 95 is also supplied to AND gate 110 which causes a logical zero to be supplied the reset terminals of flip flops 78 and 79 to cause the $\overline{Q}$ outputs of those flip flops to go high.

The high of the output of NAND gate 93 is supplied with the low $\overline{Q}$ output of flip flop 87 to the inputs of AND gate 107 to maintain the output of AND gate 107 in the low conditions.

The logical zero of the low of W1L is supplied to the input of exclusive OR gate 99 with the high of W1R which causes the input of OR gate 99 to go high. This high supplied to the inputs of NAND gate 101 with the low output of NAND gate 90 to maintain the output of NAND gate 101 in the high condition. The logical one of the high of W2L is supplied to exclusive OR gate 100 with the logical zero of W2R to cause the output of exclusive OR gate 100 to go high. This high is supplied to the inputs of NAND gate 102 with the high output of NAND gate 93 which causes the output of NAND gate 102 to go low. This low is supplied to the input of NAND gate 103 with the high of the output of NAND gate 101 to cause the $\phi$ signal 121 to move to the high condition as illustrated at vertical line 132. The high of flip flop 86 is provided to AND gate 106 with the low output of NAND gate 90 to produce a low output from AND gate 106. This low output is supplied with the low output of AND gate 107 to the inputs of NOR gate 108 to cause the POS/$\overline{NEG}$ waveform 124 to move to the high condition at vertical line 132.

The high condition of the W2/$\overline{W1}$ signal 123 indicates that the window 2 or trailing edge of the signals VOL or VOR is being processed.

When the VOR waveform 116 goes to the low condition at vertical line 133, the W2R signal 119 moves to the high condition and the W1R signal 120 moves to the low condition.

The high value of W2R is supplied to the clock of flip flop 83 causing the $\overline{Q}$ output to move to the low condition. This low condition is supplied with the low condition of the $\overline{Q}$ output of flip flop 82 to NAND gate 93. However NAND gate is already in the high condition as discussed in connection with the vertical line 132, and its output is not changed.

The logical zero of the low of W1R is supplied to the inputs of exclusive OR gate 99 with the low of W1L to cause the output of exclusive OR gate 99 to move to the low condition. The logical one of the high of W2R is provided to exclusive OR gate 100 with the high of W2L to cause the output of exclusive OR gate 100 to also move to the low condition. The low output of exclusive OR gate 99 is provided to the inputs of NAND gate 101 with the low output of NAND gate 90 which causes no change in the high output of NAND gate 101.

The low output of exclusive OR gate 100 is provided to the inputs of NAND gate 102 with the high of the output of NAND gate 93 to cause the output of NAND gate 102 to move to the high condition. This logical one is supplied to the input of NAND gate 103 with the logical one provided by the output of NAND gate 101 to cause the output of NAND gate 103 to move to a low condition. Thus at vertical line 133, the $\phi$ signal waveform 121 moves to the low condition. The condition of the other elements of FIG. 14 are also not changed by the W1R and W2R changes and thus the other signals 123 and 124 remain in the same condition. The high of POS/$\overline{NEG}$ signal 124 indicates that the time of the $\phi$ signal 121 between vertical lines 132 and 133 should have a positive value.

As mentioned in connection with waveform 122 at 143, at the end of time period "c" the DATAREADY signal 122 moves to the positive condition at a time before vertical line 134.

Illustrated at vertical line 134 is the condition where the mass flow through the tubes 14 and 16 of the flowmeter illustrated in FIG. 1 is sufficient to cause the left sensor L to turn on first and thus VOL will move to the high condition before VOR as discussed in connection with FIGS. 11, 12 and 13.

When the VOL waveform 15 goes to the high condition at vertical lines 134, the W2L waveform 117 goes low and the W1L waveform 118 goes high. The new high of W1L is supplied to the clock input of flip flop 78 to cause the $\overline{Q}$ output of flip flop 78 to go to the low condition. This low condition is supplied with the high output of the $\overline{Q}$ terminal of flip flop 79 to the NAND gate 90 to cause the output of the NAND gate 90 to go to the high condition. This high condition causes a positive going pulse at the output of RC circuit 91 which is inverted by the inverter 92 and supplied to the A1 terminal of one shot 96 to cause the DATAREADY signal 122 to move low at vertical line 134. This low output of inverter 92 is also provided to AND gate 111 which in turn supplies a low to the reset terminals of flip flops 82 and 83 to move their $\overline{Q}$ outputs to the high condition. These high conditions are supplied to the input terminals of NAND gate 93 to cause the output of NAND gate 93 to go low, and thus the W2/$\overline{W1}$ waveform 123 to move low at vertical line 134.

The present high of W1L is supplied with the previous low of W1R to exclusive OR gate 99 to cause the output of exclusive OR gate 99 to go high. This high is supplied with the high output of NAND gate 90 to the inputs of NAND gate 101 which causes the output of NAND gate 101 to move to the low condition. The new low of W2L is supplied with the previous high of W2R to the exclusive OR gate 100 to cause output of exclusive OR gate 100 to move to the high condition. This high condition is supplied with the low output of NAND gate 93 to the input terminals of NAND gate 102 to cause its output to move to the high condition. The high output of NAND gate 102 is supplied with the low output of NAND gate 101 to the input terminals of NAND gate 103 to cause the $\phi$ signal 121 to move to the high condition. The high $\overline{Q}$ output of flip flop 86 is supplied with the new high output of NAND gate 90 to AND gate 106 to cause a new high output of AND gate 106.

The new low condition of the output of NAND gate 93 is supplied with the low output of $\overline{Q}$ of flip flop 87 to AND gate 107 to maintain the output of AND gate 107 in the low condition. The high output of AND gate 106 and the low output of AND gate 107 is supplied to the input terminals of NOR gate 108 to cause the POS/NEG signal 124 to move to the low condition.

At the end of window 1 illustrated as vertical line 135 in FIG. 15, the VOR signal goes to its high condition resulting in the W2R waveform 119 going to its low condition and W1R waveform 120 going to its high condition. The logical one input of the W1R signal to the clock of flip flop 86 causes the $\overline{Q}$ output of flip flop 86 to go to its low condition.

The logical one of the high condition of W1R is also input into the clock of flip flop 79 causing a low condition to be transferred to the $\overline{Q}$ output of flip flop 79. This low condition is input into NAND gate 90 with the previous low condition of the $\overline{Q}$ output of flip flop 78 to maintain the output of NAND gate 90 in the high condition. The logical zero of the $\overline{Q}$ output of flip flop 78 is input with the high conditon of NAND gate 90 to the inputs of AND gate 106, switching the output of AND gate 106 to the low condition.

The output of AND gate 107 is not changed by the rising voltage of the VOR signal 116 and thus the low inputs into NOR gate 108 results in the POS/NEG signal 124 going to the high condition.

The logical one of the W1R signal 120 input into the exclusive OR gate 99 with the high of the W1L signal 118 causes the output of exclusive OR gate 99 to be changed to the low condition. This low condition is input with the high condition of the output of NAND gate 90 into the NAND gate 101 resulting in the output of NAND gate 101 changing to the high condition. The low condition of W2R waveform 119 is input into the exclusive OR gate 100 with the low condition of the W2L signal 117 resulting in the output of exclusive OR gate 100 changing to the low condition. This low condition is input with the low output of NAND gate 93 into the NAND gate 102 to maintain the output of NAND gate 102 in the high condition. The high output of NAND gate 102 is input with the new high output of NAND gate 101 into the NAND gate 103 to cause the $\phi$ signal 121 to be switched to the low condition. The inputs into the other elements of FIG. 14 are not operative to change the output conditions of any of these elements and thus the condition of the W2/W1 signal 123 remains in the low condition.

The situation where the VOL output of the left sensor L is turned on before the VOR output of the right sensor R is illustrated and discussed in connection with FIGS. 11, 12 and 13. In this situation the time "a" should have a positive value and should be added to the time of the interval "b" to give a proper indication of the mass flow flowing through the meter. It will be noted in FIG. 15 that in the situation where VOL leads VOR in window 2 and is immediately followed by the situation where VOL leads VOR in window 1, that the POS/NEG signal 124 goes to the low condition in window 1 as illustrated by waveform 124 between vertical lines 134 and 135. However, the computer does not interrogate the level of the POS/NEG waveform 124 until the end of time "c" when the DATAREADY signal 122 goes to the high condition. At this point, illustrated at 145 in FIG. 15, the POS/NEG signal 124 has returned to the high condition. Thus, when the microprocessor of the preferred embodiment is ready to accept the time interval "a" of the $\phi$ signal 121 between the vertical lines 134 and 135 this interrogation takes place after 145 when the POS/NEG signal 124 is in its high condition thereby giving the value of time interval "a" between vertical lines 134 and 135 a positive value.

At the beginning of window 2, shown at vertical line 136, the VOL voltage 115 drops to a low condition causing W2L signal 117 to go to a high condition and W1L signal 118 to go to a low condition. The new high condition of the W2L signal 117 is input into the clock of flip flop 82 resulting in the $\overline{Q}$ output of flip flop 82 going to a low condition. This low condition input with the high condition of the $\overline{Q}$ output of flip flop 83 into NAND gate 93 causes the output of NAND gate 93 to go to the high condition causing the previously discussed pulse from RC circuit 94 which in turn resets the $\overline{Q}$ outputs of flip flops 78 and 79 to the high condition. The negative going pulse output from inverter 95 also is input into the A2 terminal of the one shot device 96 causing the DATAREADY signal 122 to go to the low condition for the predetermined time "c."

The previous low condition of the $\overline{Q}$ output of flip flop 86 input with the new low condition of NAND gate 90 into AND gate 106, and the previous low condition of $\overline{Q}$ of flip flop 87 input into AND gate 107 with the new high condition of the output of NAND gate 93 causes the outputs of AND gates 106 and 107 to remain in a low condition and therefore the output of NOR gate 108 remaining in the high condition. Thus the POS/NEG signal 124 remains in the high condition.

The $\phi$ signal 121 goes to the high condition as previously discussed in connection with vertical line 132.

At the end of window 2, illustrated at vertical line 137, the $\phi$ signal 121 drops to its low condition and the other signals remain the same as previously discussed in connection with vertical line 133. One change in the settings of the elements of FIG. 14 at vertical line 137 from that discussed in connection with the setting of the elements at vertical line 133, is that the $\overline{Q}$ output of flip flop 86 is in the low condition. In this situation the output of AND gate 106 will still remain in the low condition as the inputs to AND gate 106 are both in the low condition. The inputs into NOR gate 108 at vertical line 137 is a low output from AND gate 106 and a low output from NAND gate 107 thus maintaining the POS/NEG signal 124 in the high condition.

Shown in FIG. 15 between vertical lines 138 and 141 is the situation wherein the voltage output VOR from the right sensor R leads the voltage output wave VOL from the left sensor L in both the leading and trailing edges of the waves 115 and 116. This condition could arise for instance wherein external vibrations or other forces would apply torque to the tubes to cause an error, or where the flow through the meter would be in the reverse direction from that previously discussed such that the right sensor would come on earlier with increasing mass flow. In the normal flow of the material through the meter as previously discussed, it can be seen that the voltage output form VOL shifts in the leftward direction with increasing mass flow with respect to voltage output wave VOR. However, if the flow direction is reversed, the waveform VOL would shift in the rightward direction with respect to the waveform VOR with increasing mass flow.

In the situation illustrated at vertical line 138, the W2R waveform 119 would to to the low condition and the W1R waveform 120 would go to the high condition. The new high condition of W1R would be applied to the clock of flip flop 86 making the $\bar{Q}$ output of flip flop 86 move to the high condition since the D terminal would be subjected to the low condition of the W1L waveform 118. The high condition of W1R would also be applied to the clock of flip flop 79 which would ultimately cause the $\bar{Q}$ outputs of flip flops 82 and 83 to be reset to the high condition as previously explained. The setting of the $\bar{Q}$ output of flip flop 79 to the low condition would also trigger the one shot device 96 by applying a logical zero to the A1 input as previously explained.

As previously discussed, the output of the exclusive OR gates 99 and 100 would move to the high condition and if followed through the elements of FIG. 14 in the manner previously discussed it will be understood by one skilled in the art that the $\phi$ signal 121 would move to the high condition and the W2/$\overline{W1}$ would be changed to the low condition responsive to the output of NAND gate 93.

The input to AND gate 106 would be the new high of the $\bar{Q}$ output of flip flop 86 and the new high of the NAND gate output 90 such that the output of AND gate 106 would be high. The input to AND gate 107 would be the low of the $\bar{Q}$ output of flip flop 87 and the new low of the output of NAND gate 93 resulting in an output of the AND gate 107 to be in the low condition. With the inputs of NOR gate 108 thus being a high and a low, the output of NOR gate 108 would move to the low condition. This would result in the POS/$\overline{\text{NEG}}$ signal 124 going to the low condition as shown at the vertical line 138.

At the end of window 1 shown at vertical line 139, the W2L signal 117 would go to the low condition and the W1L signal 118 would go to the high condition. As previously discussed in connection with vertical line 131, the output of exclusive OR gate 99 would move to the low condition causing the output of NAND gate 101 to move to the high condition in turn switching the output of NAND gate 103 to the low condition thereby causing the $\phi$ signal 121 to move to the low condition as illustrated at vertical line 139. As previously discussed in connection with vertical line 131, the other elements of FIG. 14 would not be switched. Thus, the W2/$\overline{W1}$ signal 123 and the POS/$\overline{\text{NEG}}$ signal 124 would both remain in the low condition at vertical line 139.

When the VOR signal from the right sensor R moves to the low condition as shown at vertical line 140, the W2R signal 119 moves to the high condition and the W1R signal 120 moves to the low condition. The new high of W2R to the clock of flip flop 83 causes the $\bar{Q}$ output of flip flop 83 to move to the low condition which, when joined with the high output of the $\bar{Q}$ of flip flop 82, causes the output of NAND gate 93 to move to the high condition. This high condition causes a positive going pulse in RC circuit 94 which is inverted by inverter 95 to reset the $\bar{Q}$ outputs of flip flops 78 and 79 to the high condition and to fire the one shot device 96 for the "c" time illustrated as starting at vertical line 140 in waveform 122.

The W2/$\overline{W1}$ signal 123 will move to the high condition responsive to the output of NAND gate 93 and indicates that the trailing edge of the voltage output waveforms VOL and VOR is being processed.

The reset high $\bar{Q}$ outputs of flip flops 78 and 79 cause a low output from NAND gate 90 which, when joined with the high output of flip flop 86, cause the output of AND gate 106 to go to the low condition. The input to AND gate 107 will be the new high condition of NAND gate 93 and the new high condition of flip flop 87 which is caused by inputting the logical one of the W2R signal into the clock of flip flop 87 when the W2L voltage is at a low condition. These two high inputs to AND gate 107 cause the output of AND gate 107 to go to the high condition which, when joined with the new low condition of AND gate 106, maintains the output of the NOR gate 108 in the low condition. Thus the POS/$\overline{\text{NEG}}$ signal 124 remains in the low condition at vertical line 140.

As previously discussed in connection with vertical line 133, the outputs of exclusive OR gates 99 and 100 go to the high condition. The output of NAND gate 101 goes to the low condition responsive to the low input from NAND gate 90 and the high input from exclusive OR gate 99. Also, the output of NAND gate 102 goes to the low condition responsive to the high output of OR gate 100 and the high output of NAND gate 93. Responsive to these low outputs of NAND gates 101 and 102, the output of NAND gate 103 goes to the high condition causing the $\phi$ waveform 121 to go to the high condition at vertical line 140.

When the VOL waveform 115 move to the low condition at vertical line 141, the positive edge of the high of W2L applied to the clock of flip flop 82 will cause the $\bar{Q}$ output of the flip flop 82 to move to the low condition. This new low condition is joined with the low condition of flip flop 83 in NAND gate 93 to maintain the output of NAND gate 93 in the high condition. Thus it will be understood that the POS/$\overline{\text{NEG}}$ signal 124 will remain in the low condition and the W2/$\overline{W1}$ signal 123 will remain in the high condition. The output of exclusive OR gates 99 and 100 will move to the low condition which, when joined with the low output of NAND gate 90 in NAND gate 101 and the high output of NAND gate 93 in NAND gate 102, will cause the outputs of both NAND gates 101 and 102 to move to the high condition. When these high outputs are input into NAND gate 103, the output of NAND gate 103 will move to the low condition as illustrated in the switching of the $\phi$ signal 121 to the low condition at vertical line 140.

At the end of the DATAREADY pulse after time "c," the microprocessor will poll the status of the W2/$\overline{W1}$ signal 123 and the status of the POS/$\overline{\text{NEG}}$ signal 124 and assign a negative value to the time "b" that the $\phi$ signal was in the high condition between vertical lines 140 and 141. It can thus be seen that the times "a" and "b" of the $\phi$ signal 121 between vertical lines 138 and 141 will be assigned a negative value which, when summed together, will give a negative number. This negative number is recognized by the microprocessor as being an error and may either be ignored or treated by the microprocessor as a flow in the reverse direction.

An appropriate switching means could be made available to the microprocessor to indicate that the flow of material through the flowmeter is in the opposite direction such that when the VOL waveform moves rightwardly with respect to the VOR waveform as illustrated in the waveforms between vertical lines 138 and 141 the microprocessor will add the time "a" of the $\phi$ signal 121 between vertical lines 138 and 139 to the time "b" of the $\phi$ signal 121 between vertical lines 140 and 141 to give a positive number. If such an indicating means were set to indicate that the flow was in the reverse direction such that the right sensor came on earlier with increasing mass flow and the right sensor R turned on before the left sensor L during window 1 and the left sensor L turned off before the right sensor R in the window 2, the time interval between the turning off of the two sensors in window 2 would be subtracted from the time interval between the turning on of the two sensors in window 1. Thus, such an indicating means would provide a flowmeter which would register flow in either direction depending upon the setting of the indicating means and which would ignore errors caused by external torque applied to the flow tubes such that the voltage waveforms VOL and VOR shifted in the wrong directions.

The discriminator circuit 70 of FIG. 14 is set to go to the high condition after the voltage wave 115 of the left sensor L increases past the nonlinear portion of the sensor's operating characteristics as shown at point 125 in FIG. 15. Similarly, the discriminator circuit 71 of FIG. 14 is designed to go to the high condition after the voltage wave 116 has increased to a predetermined point as shown at 126 of FIG. 15. Discriminators 70 and 71 thus ensure that the W2L waveform 117, the W1L waveform 118, the W2R waveform 119, and the W1R waveform 120 are not produced until the voltage waveforms 115 and 116 have passed their nonlinear portions to increase the accuracy and repeatability of the waveforms 117, 118, 119 and 120.

As previously explained, the time interval between the passing of the left and right sides of a loop in the flowmeter is not dependent upon natural frequency of the loops 11 and 16, or the amplitude of the vibrations caused by the vibrating means 30. However, it has been found that the slope of the curve of the output of the right and left sensors R and L respectively are affected by the velocity of the blades 23 and 25 as they turn the sensors 24 and 26 on and off. An automatic gain control circuit controlled by the center sensor 35 is included to control the amplitude of vibrations of the loops 11 and 16 as caused by the vibrating means 30. This amplitude control prevents the excursion of the loops 11 and 16 from getting so large as to cause mechanical hitting of the parts of the apparatus, and to prevent the excursion from getting so small that the slope of the output of sensors L and R are overly affected by drift in the interrupter modules of the sensors. This center sensor 35 could be removed and replaced, for instance, by other peak detecting means as is known in the art.

Figure 16:
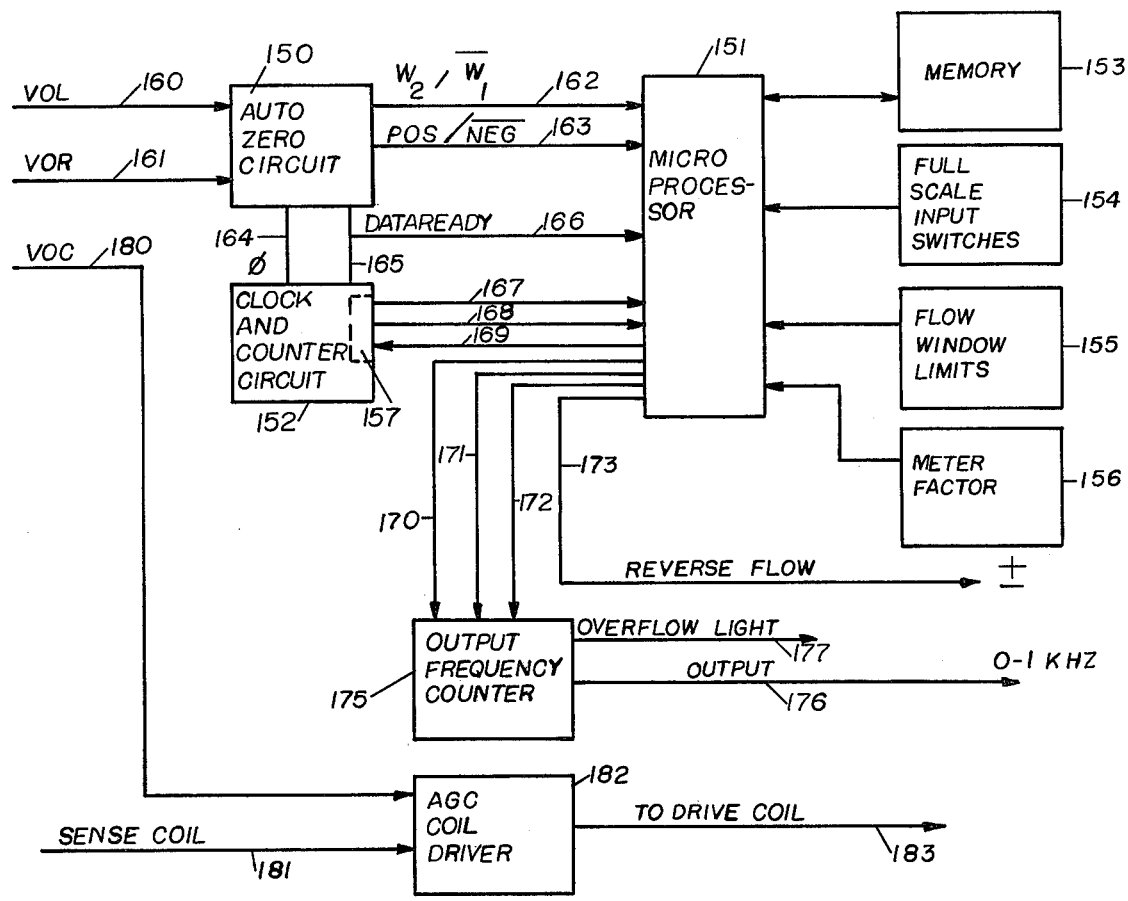
FIG. 16 is an over-all schematic diagram of the electronics of the mass flowmeter.

FIG. 16 is a schematic diagram of the electronics of the flowmeter and includes an auto zero circuit 150, a clock and counter circuit 152, a microprocessor 151, a memory 153, full scale input switches 154, a flow window limit input means 155, and a meter factor input means 156. The electronics also include an output frequency counter 175, and an automatic gain control and coil driver circuit 182. The auto zero circuit 150 may be that described in connection with FIG. 14.

The VOL signal 115 from the left sensor L is provided to the auto zero circuit 150 over conductor 160. The VOR signal 116 from the right sensor R is provided to the auto zero circuit 150 over conductor 161. The processing of these signals is discussed in connection with FIGS. 14 and 15.

The W2/$\overline{W1}$ signal 123 is provided by the auto zero circuit 150 to the microprocessor 151 over conductor 162. The POS/$\overline{NEG}$ signal 124 is provided from the auto zero circuit 150 to the microprocessor 151 over conductor 163.

The $\phi$ signal 121 is provided by the auto zero circuit 150 to the clock and counter circuit 152 over conductor 164. The DATAREADY signal 122 is provided by the auto zero circuit to the microprocessor 151 over conductor 166 and to the clock and counter circuit 152 over conductor 165.

The DATAREADY signal 122 enables the clock and counter circuit 152 to "and" the $\phi$ signal 121 with a clock signal, for instance a 100 megahertz oscillator. This will result in a burst of pulses having a frequency of 100 megahertz for a duration having a time width of either time "a" or time "b" as previously discussed.

These pulses are counted by an appropriate counter and stored in a register 157 in clock and counter circuit 152. At the end of time "c", at for instance 143, the mentioned pulses have been counted and their total is stored in the register 157, and the DATAREADY signal 122 goes to a high. This high enables the microprocessor 151 to read the data in the register 157, over a parallel data bus 167.

After the data has been transmitted by the data bus 167, the microprocessor 151 clears the counter register 157 by sending a reset signal to the register 157 over an appropriate reset conductor 169. Circuit 152 is then prepared to count the time of the next pulse of the $\phi$ signal 121.

If the number of pulses is larger than register 157 can hold, an overflow signal is sent over conductor 168 with the data on data bus 167. The microprocessor 151 will indicate this overflow condition as will be discussed in connection with the software of FIGS. 17a and 17b.

The W2/$\overline{W1}$ signal 123 received over conductor 162 indicates to the microprocessor 151 whether the count received over data bus 167 occurred in window 1 or window 2, and the POS/$\overline{NEG}$ signal 124 received over conductor 163 instructs the microprocessor 151 whether the count received over data bus 167 has a positive or a negative value.

The microprocessor 151 is controlled by a set of programmed instructions which reside in memory 153. A set of binary full scale input switches 154 provide a binary signal to the microprocessor 151 at appropriate times, as controlled by the program in memory 153, transmitting the time difference value which would result in a full scale reading in a rate meter attached to the output frequency counter 175. A set of flow window input switches 155 instruct the microprocessor 151, at appropriate times as controlled by the program in memory 153, the limits of the flow window to be used with the input data. For instance, in one preferred embodiment the flow window switches 155 have three settings of either 25%, 50% or 75%. If the 50% setting, for instance, is selected this means that the combined time count of times "a" and "b" must have a deviation of less than 50% from a set number of previous readings in order for the combined time count to be accepted by the microprocessor as good data. If the new combined count determined by the microprocessor deviates more than 50% from the set number of previous readings, the present number is ignored and the output is not changed until an acceptable reading is received. If the new input is rejected a set number of times, the microprocessor accepts the next count without the mentioned flow window check.

To display the mass flow in engineering units, a set of meter factor switches 156 may be included to enter a full scale flow, such as pounds per minute, corresponding to the full scale time as input by 154.

The output from the microprocessor 151 to the output frequency counter 175 includes a set/reset signal bus 170, an overflow signal bus 171, a parallel digital output bus 172, and a reverse flow signal conductor 173.

A signal from signal bus 170 will enable the output frequency counter circuit 175 to receive a count from output bus 172. A second signal from bus 170 will cause the number received from output bus 172 to be converted to a frequency output having a frequency determined by the value of the binary number of bus 172 and compatible with a standard flow meter rate and totalizer (not shown). Such an instrument requires an input signal having a frequency of from 0 to 1 kilohertz, and is available, for instance, from the Special Products Division of Halliburton Services of Duncan, Oklahoma under the designation of LO-II flow totalizer.

If the microprocessor 151 determines that an overflow condition exists, an overflow signal is sent to the output frequency counter 175 over conductor 171. This causes the output frequency counter 175 to transmit a 1 kilohertz signal over line 176, and to turn on an overflow indicator over conductor 177.

If the microprocessor 151 determines that the flow through the meter is in the reverse direction, a reverse flow indication signal may be transmitted over conductor 173. This signal may be used to turn on an indicator to indicate reverse flow, or may cause the reading of an appropriate totalizer to count down to indicate the net flow through the meter, or both. One preferred embodiment may operate appropriate safety devices to stop all flow where reverse flow is not desired for the particular application of the meter.

The voltage output VOC of the center interrupter module 35 is supplied over conductor 180 to the AGC coil driver circuit 182. An output signal from a sense coil 33 is provided over conductor 181 to AGC driver circuit 182. This sense coil would provide a signal responsive to the vibrations caused by vibrating means 30 and may be provided by a separate sense coil 33 around pole piece 31. The gain of circuit 182 would be controlled by the signal 181 from sense coil 33, and the on/off signal from interrupter module 35, to control the signal provided to drive coil 32 over conductor 183 such that the amplitude of the vibrations of vibrator means 30 is held at a constant value. The controlling of the vibrations of loops 14 and 16 ensures that mechanical nonlinearities are not introduced due to hitting of mechanical parts, and a minimum amplitude is maintained such that the time delays due to coriolis acceleration may be measured with sufficient accuracy. The coil driver circuit 182 may also be controlled by the signal from sense coil 33 provided over conductor 181 such that the signal to drive coil 32 over conductor 183 is supplied in resonance with the natural vibrating frequency of the tuning fork formed by loops 11 and 16 as is known in the art.

A microprocessor suitable for the microprocessor 151 is the 8080 microprocessor of the Intel Corporation of Sant Clara, California. The 8080 microprocessor may be programmed in accordance with the 8085 instruction set discussed at pages 3–12 through 3–28 of the MCS-85 User's Manual 98–366C published by Intel Corporation and dated June 1977.

Figure 17A:
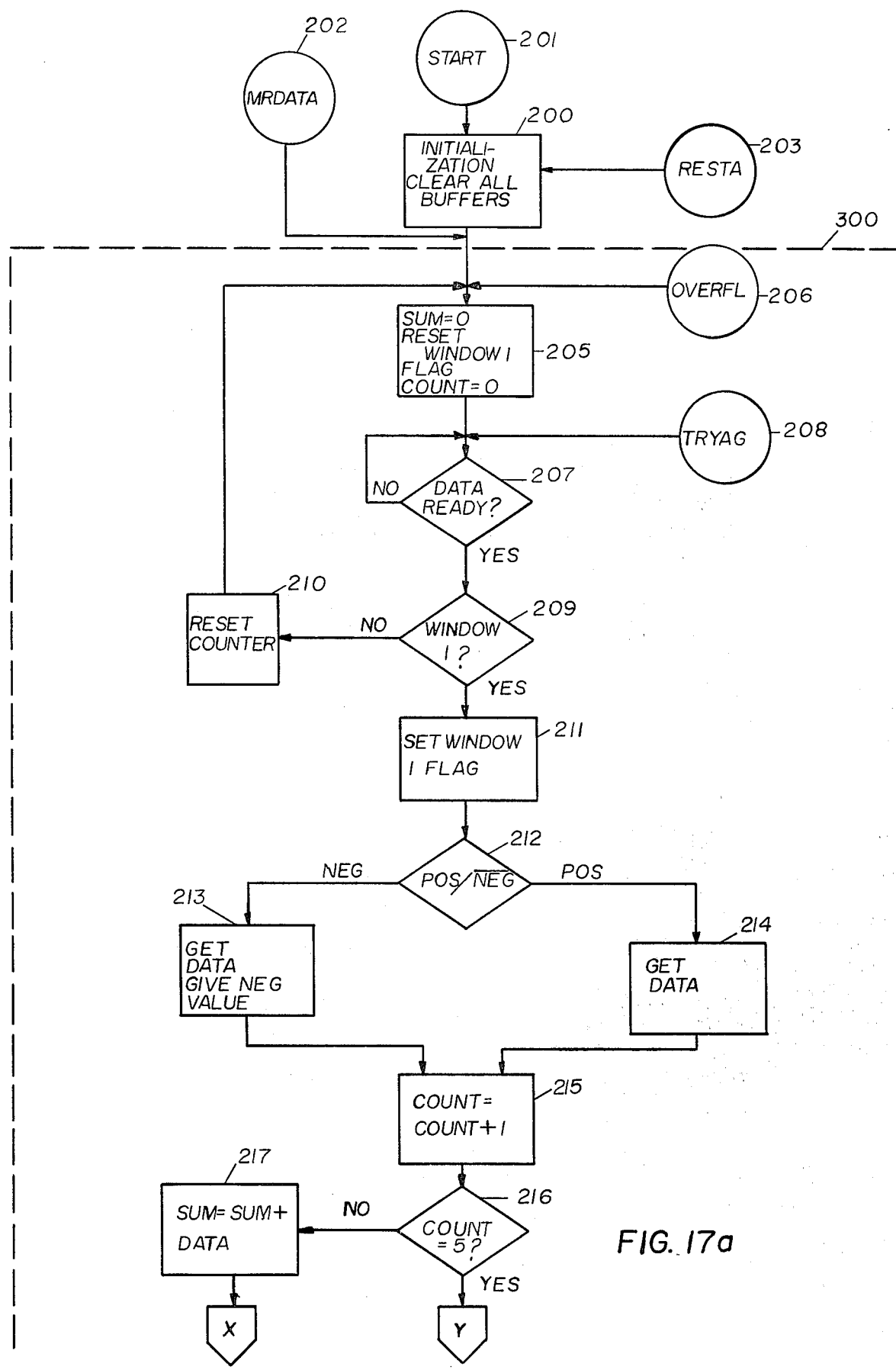
FIGS. 17a and 17b show a flow chart of a program which may be used with a microprocessor of the electronics of FIG. 16.
Figure 17B:
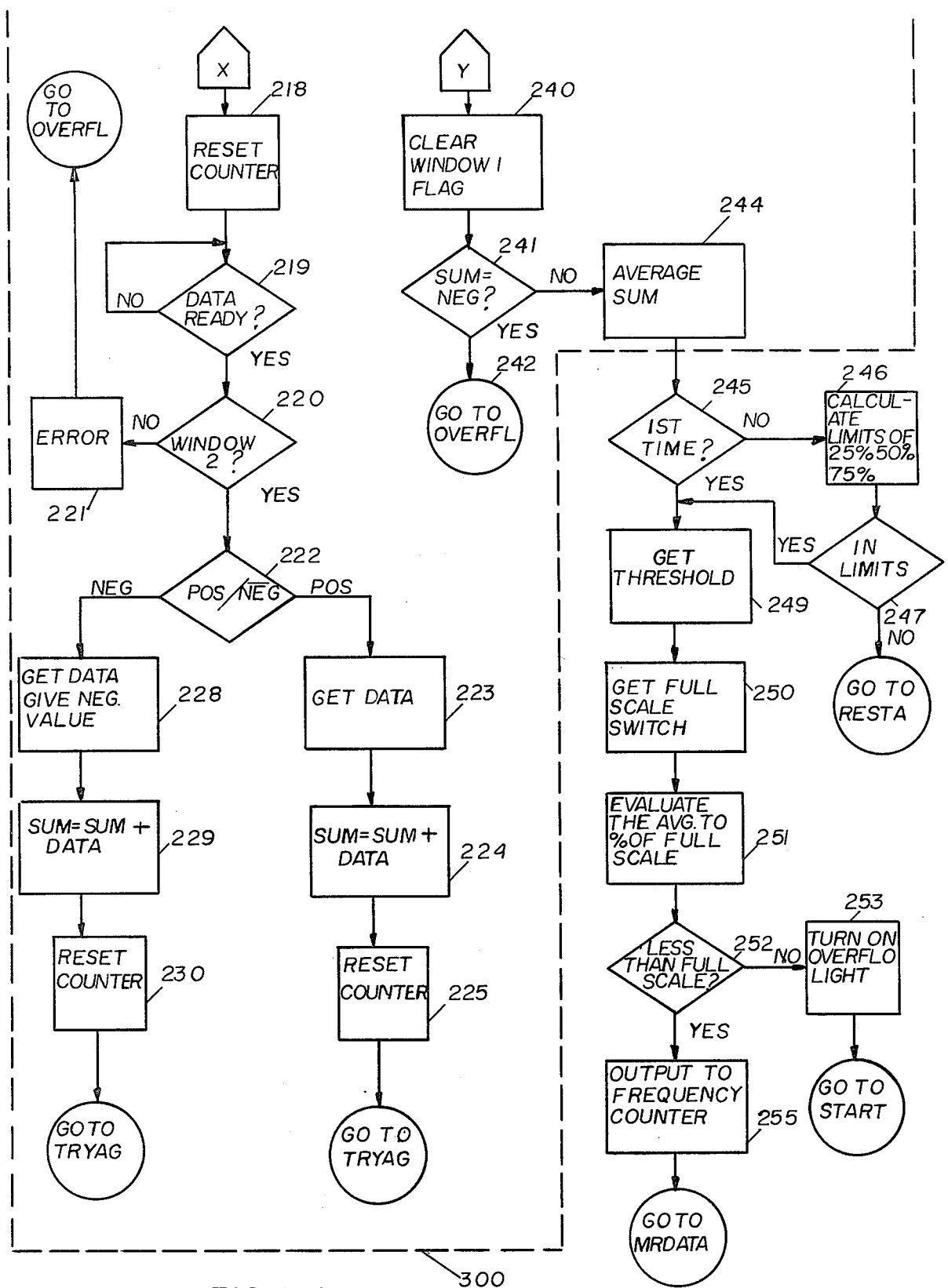

Shown in FIGS. 17a and 17b is a flow chart for the program listing of Table I. The line numbers referred to in this discussion refer to the line numbers found in the first column of Table I.

The program which is stored in the memory 153 for use by the microprocessor 151 of FIG. 16 is composed of a main program labeled system flow and listed at line 00001 through line 00139; a subroutine labeled RDHOLD for reading the threshold and listed from line 00091 through line 00139; and subroutine labeled RDFUSC for reading the full scale switch and listed at line 00140 through line 00153; a subroutine labeled EVAL for calculating limits and listed at line 00217 through line 00433; a subroutine labeled GTDATA for getting three bytes of data and averaging, and listed at line 00434 through line 00634 and shown within the dotted lines labeled 300 in FIGS. 17a and 17b; a subroutine labeled COMPAR for finding a 19 bit average less than full scale and listed at line 00635 through line 00663; and an output subroutine labeled COMPUT as shown at line 00664 through line 00908, all of Table I. The bytes rightshift subroutine labeled RSH3BY at lines 00200 through 00212 is used in several of the other routines in the program listing.

The main routine at 200 initializes the registers in the program and clears all buffers such as shown in line 00003 through line 00018 of the program. This clearing routine includes clearing the counter 157 at lines 00003 and 00004 and resetting the output frequency counter 175 at lines 00005 and 00006 of the program listing. Line 00003 is labeled START and line 00007 is labeled RESTA for later use by the program, and are shown at 201 and 203 of FIG. 17a respectively.

After the initialization routine 200, program statement line 00019 labeled MRDATA calls the GTDATA subroutine 300. Line 00019 is shown at 202 in FIG. 17a.

In the GTDATA routine the program sets the variable SUM equal to zero, resets the window 1 flag and sets the count variable CNT equal to zero at line numbers 00439 through line 00443. At 207 the program checks the DATA-READY signal 122 transmitted to the microprocessor 151 by conductor 166 and returns to the statement labeled TRYAG until the DATA-READY signal 122 is in the high condition. This check is shown at lines 00444 through 00446 of the program.

After the auto zero circuit 150 indicates that data is ready, the program at 209 checks to see if the data to be received is in window 1. This check is made at lines 00450 through 00452 and checks the $\overline{W2/W1}$ signal 123 to see if it is in the high or low condition. If the check indicates that the data received is not in window 1, the program resets the counter register 157 at 210 by transmitting a reset command over conductor 169, and transfers the program back to the statement OVERFL at 206. This is done at lines 00453 and 00454 of the program.

If the check at 209 indicates that the data received is in window 1, the window 1 flag is set at 211, program statement 00462, and the POS/$\overline{\text{NEG}}$ signal 124 is checked at 212, program lines 00463 and 00464, to determine if the data should have a negative or positive value. If the POS/$\overline{\text{NEG}}$ signal 124 indicates that the data should have a negative value, the input data is read and the data is given a negative value at 213, program lines 00466 through 00479. If the check at 212 indicates that the data should have a positive value, the data is read at 214, program lines 00506 through 00516. After the data is acquired at either 213 or 214, the count variable CNT is incremented by one at 215, program lines 00480 through 00481.

At 216, program lines 00482 through 00484, the count variable CNT is checked to see if it has reached 5. If it has not, the variable SUM is increased by the value of the data read at 213 or 214 with its appropriate sign. This addition is accomplished by the routine ADD20B shown at lines 00595 through 00634 of the program listing.

The number of passes through check 216 may be varied as desired. For instance in one preferred embodiment of the invention, an input is provided to the microprocessor 151 such that the number of counts may be changed as desired for the size of the meter whose data is being processed by the electronics of FIG. 16. This count and the resulting average, to be discussed later, has the effect of averaging out any variation over several cycles to provide a smoother output.

After the data is summed at 217, the counter 157 is reset at 218, program line 00521. The DATAREADY signal 122 is then checked and rechecked at 219 until the DATAREADY signal 122 goes high to indicate that there is data to be received from register 157. This check is done at program lines 00522 through 00524. The program at 222, program lines 00525 through 00527, then checks the signal W2/$\overline{\text{W1}}$ 123 to see if the meter is in the window 1 or window 2 condition. If the W2/$\overline{\text{W1}}$ signal 123 does not indicate a window 2, the program, at lines 00561 and 00562, goes through an error routine 221 to the OVERFL statement 206, at program line 00569, to start the GTDATA routine over. The error routine 221 outputs an overflow signal at program line 00562 to indicate that an error has occurred.

If the signal 123 indicates that the meter is in a window 2 condition, the POS/$\overline{\text{NEG}}$ signal 124 is checked to see if the data should receive a positive or negative value.

If check 222 indicates that the data has a negative value, the program at 228, program lines 00531 through 00540, receives the data from register 157 over bus 167 and gives the data a negative value. This negative data is then added to the variable SUM at 229, program statement 00545, and the register 157 is reset at 230, program line 00546. The program then transfers back to the TRYAG statement 208 by statement number 00547 to continue collecting data for the number of cycles specified in check 216.

If the check at 222 indicates that the data should have a positive value, the data is acquired at 223, program lines 00548 through 00557, and the data is added to the variable SUM at 224, program line 00558, the counter 157 is reset at 225, program statement 00559, and program transfers back to statement TRYAG 208 at program statement 00560.

If the check at 216 indicates that the count variable CNT has been incremented to 5, the program goes to the clear window 1 flag instruction 240 at program statement 00485. It will be understood by those skilled in the art that a total of 4 vibration cycles of the loops 11 and 16 will have occurred between each true response of the check 216.

A check is made at 241, program lines 00487 through 00488, to see if the variable SUM has a negative value. In the embodiment shown in FIG. 17b, if the sum is negative the program transfers to the OVERFL statement 206 and the program begins to collect a new set of data.

In another embodiment, a reverse flow signal may be output by microprocessor 151 over conductor 173 and the program would transfer to the average sum routine 244.

If the check at 241 indicates that the variable SUM is not negative, the program transfers to the average sum routine 244, program statements 00490 through 00505, and averages the value for the specified number of times of check 216. In the embodiment of the program illustrated by FIGS. 17a and 17b, the average time shift caused by the coriolis forces on loops 11 and 16 as corrected by the auto zero circuit 150 would be determined by dividing the variable SUM by 8.

The program then transfers out of the GTDATA routine 300 and back to the mainline program to determine at check 245, program statements 00023 through 00025, if this is the first time the program has passed this point during this loop.

If the check at 245 is yes, the program passes to 249 to get the threshold values for the flow window calculations. At this point, statement number 00029, the values from the flow window switches 155 are read by the microprocessor 151 in the subroutine RDHOLD as shown at statements 00091 through 00139 of the program listing. After reading the flow window switches 155, the program goes to 250, statement number 00030, to read the full scale switches 154. The full scale switches 154 are read by the microprocessor in the RDFUSC subroutine as listed in lines 00140 through 00153 of the program listing.

The program then evaluates the average determined at 244 as a percent of full scale by calling, at line number 00031, the COMPAR subroutine as listed in statements 00635 through 00663 of the program listing. At 252, statement numbers 00032 through 00034, a check is made to determine if the average is less than full scale. If the average is greater than full scale, the program turns on the overflow light at 253, statement numbers 00035 and 00036, and returns to the start statement 201 as executed at statement number 00037 of the program listing.

If the check at 252 determines that the average value is less than full scale, the average value is output to the frequency counter at 255, line numbers 00044 through 00070 of the program listing, which is accomplished by calling the COMPUT subroutine listed in line numbers 00664 through 00908 of the listing. After outputting the average value as a percent of full scale, the program returns to statement MRDATA 202 as executed in statement number 00071 of the listing.

If at 245 the check indicates that this is not the first time through the loop, the program transfers to 246 to calculate the flow window limits of one of 25%, 50% or 75% as determined by the threshold limits read from the flow window input 155 in the previous pass. This is done by calling at statement 00075 the subroutine EVAL as listed in lines 00217 to 00433 of the program listing. After the proper limits are calculated for the flow window, the average value determined at 244 is checked with the calculated limits of 246 in the check 247 as shown in statements 00079 through 00089 of the program listing. If the average value is within the limits of the flow window, control is transferred back to the get threshold statement 249 for reading the flow window input 155 for use in the next pass. If the average is outside the limits of the flow window as determined by check 247, the program transfers back to the RESTA statement 203 at either line number 00086 or 00089.

It will be understood by those skilled in the art that the flow window input 155 may be changed at any time during the operation of the program and the new flow window values will be read in the next pass of the software through the get threshold routine 249. The program could be altered by going from the true branch of the in limits check 247 to the get full scale switch routine 250 such that the flow window input 155 is read only on each first pass.

it will also be understood by those skilled in the art that the flow window limits are checked only on every other pass through check 245. It will be understood that an additional check could be included in the subroutine such that the flow window could be checked for a desired number of times through this loop, and a new average calculated if the value is not within the limits of check 247. However, after a set number of passes through the in limits of check 247, the program should be transferred to the output branch represented by routines 249, 250, 251, 252 and 255 to prevent the flowmeter output from being held at a particular value if the mass flow through the meter is actually changing fast enough such that the average value calculated at 244 does differ from the previous value sufficiently that the new average is outside the limits of the in limit check 247.

In the illustrated embodiment the in limits check 247 is only made one time out of every two passes. As explained, the subroutine may be altered by one skilled in the art such that more passes could be made, if desired, before a new average is output to the frequency counter without comparing it to the flow window limits.

If the overflow conductor 168 is turned on because the register 157 in the clock and counter circuit 152 is not able to hold the count, this turned on conductor 168 may be included with the counter value received over data bus 167 such that the microprocessor reads the counter value in the get data routines 213, 214, 228, or 223 as a very large number. This large number would be evaluated at check 252 such that the average would be larger than full scale to thus turn on the overflow light at 253 and return the program to the start statement 201 to read a new set of data.

If the full scale input switches at 154 input a full scale value which is smaller than the actual mass flow being read by the meter, the average sum calculated at 244 will also be larger than the full scale check at 252 resulting in the overflow light being turned on at 253. If the frequency counter 175 receives an overflow command over conductor 171 as instructed by the turn on light routine 253, the output frequency counter 175 is designed to transmit a maximum frequency of 1 kilohertz over the output line 176 and to turn on the overflow line 177.

It will be seen at line number 00045 that the overflow indicator is reset each time a valid value is output at 255 to the output frequency counter 175.

In another preferred embodiment of the invention, the flow window input 155 and the flow window evaluation and checks as represented by routines 245, 246, 247, and 249 of FIG. 17b may be eliminated, and the averaging routines of the program may be relied upon to average out any high and low readings. If the flow window routines are eliminated, the size of the program may be reduced such that a different microprocessor such as an 8048 may be used for microprocessor 151. If the 8048 microprocessor is used, its on-board memory may be used in place of the external memory 153.

The embodiments of the invention discussed herein are intended to be illustrative only. The attached claims are intended to cover the disclosed embodiments and their equivalents.

TABLE I

```
00001                                              ;SYSTEM FLOW
00002         0000           >         ORG     0000H
00003  0000   AF             START     XRA     A
00004  0001   D380                     OUT     80H
00005  0003   2F                       CMA
00006  0004   D388                     OUT     88H
00007  0006   AF             RESTA     XRA     A
00008  0007   00                       NOP
00009  0008   21001F                   LXI     H,1F00H
00010  000B   77             MORE      MOV     M,A
00011  000C   2C                       INR     L
00012  000D   47                       MOV     B,A
00013  000E   00                       NOP
00014  000F   00                       NOP
00015  0010   F20B00         >         JP      MORE
00016  0013   47                       MOV     B,A
```

```
00249 016A 00                       NOP
00250 016B 00                       NOP
00251 016C 00                       NOP
00252 016D 00                       NOP
00253 016E 23          GET75  INX    H
00254 016F 7E                 MOV    A,M
00255 0170 B7                 ORA    A
00256 0171 CA8001 >           JZ     ERROR
00257 0174 CD0702 >           CALL   EV75
00258 0177 C35101 >           JMP    RETN1
00259 017A 00                 NOP
00260 017B 00                 NOP
00261 017C 00                 NOP
00262 017D 00                 NOP
00263 017E 00                 NOP
00264 017F 00                 NOP
00265 0180 3EFF        ERROR  MVI    A,0FFH
00266 0182 D3FF               OUT    0FFH
00267 0184 C30000 >           JMP    START
00268                                ;+-25%EVALUAT
00269 0187 2A231F      GET25  LHLD   1F23H
00270 018A 3A251F             LDA    1F25H
00271 018D 5F                 MOV    E,A
00272 018E CD2F01 >           CALL   RSH3BY
00273 0191 CD2F01 >           CALL   RSH3BY
00274 0194 221B1F             SHLD   1F1BH
00275 0197 7B                 MOV    A,E
00276 0198 321D1F             STA    1F1DH
00277 019B 43                 MOV    B,E
00278 019C EB                 XCHG
00279 019D 2A231F             LHLD   1F23H
00280 01A0 3A251F             LDA    1F25H
00281 01A3 4F                 MOV    C,A
00282 01A4 CD4702 >           CALL   ADD3BY
00283 01A7 22091F             SHLD   1F09H
00284 01AA 79                 MOV    A,C
00285 01AB 320B1F             STA    1F0BH
00286 01AE 2A231F             LHLD   1F23H
00287 01B1 3A251F             LDA    1F25H
00288 01B4 4F                 MOV    C,A
00289 01B5 CD5402 >           CALL   SUB3BY
00290 01B8 220C1F             SHLD   1F0CH
00291 01BB 79                 MOV    A,C
00292 01BC 320E1F             STA    1F0EH
00293 01BF 2E09               MVI    L,09H
00294 01C1 00                 NOP
00295 01C2 CD5F02 >           CALL   EVLIMT
00296 01C5 C9                 RET
00297 01C6 00                 NOP
00298                                ;+-50%EVALUTE
00299 01C7 2A231F      EV50   LHLD   1F23H
00300 01CA 3A251F             LDA    1F25H
00301 01CD 5F                 MOV    E,A
00302 01CE CD2F01 >           CALL   RSH3BY
00303 01D1 43                 MOV    B,E
00304 01D2 221B1F             SHLD   1F1BH
00305 01D5 7B                 MOV    A,E
00306 01D6 321D1F             STA    1F1DH
```

```
00307  01D9  EB              XCHG
00308  01DA  2A231F          LHLD    1F23H
00309  01DD  3A251F          LDA     1F25H
00310  01E0  4F              MOV     C,A
00311  01E1  CD4702      >   CALL    ADD3BY
00312  01E4  220F1F          SHLD    1F0FH
00313  01E7  79              MOV     A,C
00314  01E8  32111F          STA     1F11H
00315  01EB  2A231F          LHLD    1F23H
00316  01EE  3A251F          LDA     1F25H
00317  01F1  4F              MOV     C,A
00318  01F2  CD5402      >   CALL    SUB3BY
00319  01F5  22121F          SHLD    1F12H
00320  01F8  79              MOV     A,C
00321  01F9  32141F          STA     1F14H
00322  01FC  2E0F            MVI     L,0FH
00323  01FE  00              NOP
00324  01FF  CD5F02      >   CALL    EVLIMT
00325  0202  C9              RET
00326  0203  00              NOP
00327  0204  00              NOP
00328  0205  00              NOP
00329  0206  00              NOP
00330                                ;+-75%EVALUAT
00331  0207  CD8701      >   EV75  CALL    GET25
00332  020A  CDC701      >         CALL    EV50
00333  020D  2A091F          LHLD    1F09H
00334  0210  3A0B1F          LDA     1F0BH
00335  0213  47              MOV     B,A
00336  0214  EB              XCHG
00337  0215  2A0F1F          LHLD    1F0FH
00338  0218  3A111F          LDA     1F11H
00339  021B  4F              MOV     C,A
00340  021C  CD4702      >   CALL    ADD3BY
00341  021F  EB              XCHG
00342  0220  2A231F          LHLD    1F23H
00343  0223  3A251F          LDA     1F25H
00344  0226  47              MOV     B,A
00345  0227  EB              XCHG
00346  0228  CD5402      >   CALL    SUB3BY
00347  022B  22151F          SHLD    1F15H
00348  022E  79              MOV     A,C
00349  022F  32171F          STA     1F17H
00350  0232  EB              XCHG
00351  0233  58              MOV     E,B
00352  0234  CD2F01      >   CALL    RSH3BY
00353  0237  CD2F01      >   CALL    RSH3BY
00354  023A  22181F          SHLD    1F18H
00355  023D  7B              MOV     A,E
00356  023E  321A1F          STA     1F1AH
00357  0241  2E15            MVI     L,15H
00358  0243  CD5F02      >   CALL    EVLIMT
00359  0246  C9              RET
00360                                ;C,H,L+-B,D,E
00361  0247  7D        ADD3BY  MOV   A,L
00362  0248  83                ADD   E
00363  0249  6F                MOV   L,A
00364  024A  7C                MOV   A,H
```

```
00133 00CD 77                        MOV     M,A
00134 00CE C3BB00  >                 JMP     RETURN
00135 00D1 3EFF            ST75      MVI     A,0FFH
00136 00D3 23                        INX     H
00137 00D4 23                        INX     H
00138 00D5 77                        MOV     M,A
00139 00D6 C3BB00  >                 JMP     RETURN
00140                                        ;READ FULL SC
00141 00D9 F5             RDFUSC     PUSH    PSW
00142 00DA E5                        PUSH    H
00143 00DB DB84                      IN      84H
00144 00DD 6F                        MOV     L,A
00145 00DE DB85                      IN      85H
00146 00E0 67                        MOV     H,A
00147 00E1 22201F                    SHLD    1F20H
00148 00E4 DB86                      IN      86H
00149 00E6 E607                      ANI     07H
00150 00E8 32221F                    STA     1F22H
00151 00EB E1                        POP     H
00152 00EC F1                        POP     PSW
00153 00ED C9                        RET
00154 00EE 00                        NOP
00155 00EF 00                        NOP
00156 00F0 00                        NOP
00157                                        ;CLEAR THRESH
00158 00F1 E5             CLEAR      PUSH    H
00159 00F2 F5                        PUSH    PSW
00160 00F3 00                        NOP
00161 00F4 00                        NOP
00162 00F5 00                        NOP
00163 00F6 21031F                    LXI     H,1F03H
00164 00F9 3E00                      MVI     A,00H
00165 00FB 77                        MOV     M,A
00166 00FC 23                        INX     H
00167 00FD 77                        MOV     M,A
00168 00FE 23                        INX     H
00169 00FF 77                        MOV     M,A
00170 0100 21061F                    LXI     H,1F06H
00171 0103 77                        MOV     M,A
00172 0104 23                        INX     H
00173 0105 77                        MOV     M,A
00174 0106 23                        INX     H
00175 0107 77                        MOV     M,A
00176 0108 F1                        POP     PSW
00177 0109 E1                        POP     H
00178 010A C9                        RET
00179                                        ;19BIT   AVG
00180 010B E5             AVG19B     PUSH    H
00181 010C D5                        PUSH    D
00182 010D F5                        PUSH    PSW
00183 010E 2A061F                    LHLD    1F06H
00184 0111 3A081F                    LDA     1F08H
00185 0114 5F                        MOV     E,A
00186 0115 CD2F01  >                 CALL    RSH3BY
00187 0118 CD2F01  >                 CALL    RSH3BY
00188 011B CD2F01  >                 CALL    RSH3BY
00189 011E CD2F01  >                 CALL    RSH3BY
00190 0121 22231F                    SHLD    1F23H
```

```
00191  0124  7B                MOV    A,E
00192  0125  32251F            STA    1F25H
00193  0128  00                NOP
00194  0129  00                NOP
00195  012A  00                NOP
00196  012B  F1                POP    PSW
00197  012C  D1                POP    D
00198  012D  E1                POP    H
00199  012E  C9                RET
00200                                 ;BYTES  RIGHT
00201  012F  37       RSH3BY   STC
00202  0130  3F                CMC
00203  0131  7B                MOV    A,E
00204  0132  1F                RAR
00205  0133  5F                MOV    E,A
00206  0134  7C                MOV    A,H
00207  0135  1F                RAR
00208  0136  67                MOV    H,A
00209  0137  7D                MOV    A,L
00210  0138  1F                RAR
00211  0139  6F                MOV    L,A
00212  013A  C9                RET
00213  013B  00                NOP
00214  013C  00                NOP
00215  013D  00                NOP
00216  013E  00                NOP
00217                                 ;CALCULATE
00218  013F  E5       EVAL     PUSH   H
00219  0140  D5                PUSH   D
00220  0141  C5                PUSH   B
00221  0142  F5                PUSH   PSW
00222  0143  21031F            LXI    H,1F03H
00223  0146  7E                MOV    A,M
00224  0147  B7                ORA    A
00225  0148  00                NOP
00226  0149  00                NOP
00227  014A  00                NOP
00228  014B  CA5C01            JZ     GET50
00229  014E  CD8701            CALL   GET25
00230  0151  F1       RETN1    POP    PSW
00231  0152  C1                POP    B
00232  0153  D1                POP    D
00233  0154  E1                POP    H
00234  0155  C9                RET
00235  0156  00                NOP
00236  0157  00                NOP
00237  0158  00                NOP
00238  0159  00                NOP
00239  015A  00                NOP
00240  015B  00                NOP
00241  015C  23       GET50    INX    H
00242  015D  7E                MOV    A,M
00243  015E  B7                ORA    A
00244  015F  CA6E01            JZ     GET75
00245  0162  CDC701            CALL   EV50
00246  0165  C35101            JMP    RETN1
00247  0168  00                NOP
00248  0169  00                NOP
```

```
00249  016A  00                    NOP
00250  016B  00                    NOP
00251  016C  00                    NOP
00252  016D  00                    NOP
00253  016E  23          GET75     INX     H
00254  016F  7E                    MOV     A,M
00255  0170  B7                    ORA     A
00256  0171  CA8001 >              JZ      ERROR
00257  0174  CD0702 >              CALL    EV75
00258  0177  C35101 >              JMP     RETN1
00259  017A  00                    NOP
00260  017B  00                    NOP
00261  017C  00                    NOP
00262  017D  00                    NOP
00263  017E  00                    NOP
00264  017F  00                    NOP
00265  0180  3EFF        ERROR     MVI     A,0FFH
00266  0182  D3FF                  OUT     0FFH
00267  0184  C30000 >              JMP     START
00268                                      ;+-25%EVALUAT
00269  0187  2A231F      GET25     LHLD    1F23H
00270  018A  3A251F                LDA     1F25H
00271  018D  5F                    MOV     E,A
00272  018E  CD2F01 >              CALL    RSH3BY
00273  0191  CD2F01 >              CALL    RSH3BY
00274  0194  221B1F                SHLD    1F1BH
00275  0197  7B                    MOV     A,E
00276  0198  321D1F                STA     1F1DH
00277  019B  43                    MOV     B,E
00278  019C  EB                    XCHG
00279  019D  2A231F                LHLD    1F23H
00280  01A0  3A251F                LDA     1F25H
00281  01A3  4F                    MOV     C,A
00282  01A4  CD4702 >              CALL    ADD3BY
00283  01A7  22091F                SHLD    1F09H
00284  01AA  79                    MOV     A,C
00285  01AB  320B1F                STA     1F0BH
00286  01AE  2A231F                LHLD    1F23H
00287  01B1  3A251F                LDA     1F25H
00288  01B4  4F                    MOV     C,A
00289  01B5  CD5402 >              CALL    SUB3BY
00290  01B8  220C1F                SHLD    1F0CH
00291  01BB  79                    MOV     A,C
00292  01BC  320E1F                STA     1F0EH
00293  01BF  2E09                  MVI     L,09H
00294  01C1  00                    NOP
00295  01C2  CD5F02 >              CALL    EVLIMT
00296  01C5  C9                    RET
00297  01C6  00                    NOP
00298                                      ;+-50%EVALUTE
00299  01C7  2A231F      EV50      LHLD    1F23H
00300  01CA  3A251F                LDA     1F25H
00301  01CD  5F                    MOV     E,A
00302  01CE  CD2F01 >              CALL    RSH3BY
00303  01D1  43                    MOV     B,E
00304  01D2  221B1F                SHLD    1F1BH
00305  01D5  7B                    MOV     A,E
00306  01D6  321D1F                STA     1F1DH
```

```
00307 01D9 EB                   XCHG
00308 01DA 2A231F               LHLD    1F23H
00309 01DD 3A251F               LDA     1F25H
00310 01E0 4F                   MOV     C,A
00311 01E1 CD4702   >           CALL    ADD3BY
00312 01E4 220F1F               SHLD    1F0FH
00313 01E7 79                   MOV     A,C
00314 01E8 32111F               STA     1F11H
00315 01EB 2A231F               LHLD    1F23H
00316 01EE 3A251F               LDA     1F25H
00317 01F1 4F                   MOV     C,A
00318 01F2 CD5402   >           CALL    SUB3BY
00319 01F5 22121F               SHLD    1F12H
00320 01F8 79                   MOV     A,C
00321 01F9 32141F               STA     1F14H
00322 01FC 2E0F                 MVI     L,0FH
00323 01FE 00                   NOP
00324 01FF CD5F02   >           CALL    EVLIMT
00325 0202 C9                   RET
00326 0203 00                   NOP
00327 0204 00                   NOP
00328 0205 00                   NOP
00329 0206 00                   NOP
00330                                   ;+-75%EVALUAT
00331 0207 CD8701   >   EV75    CALL    GET25
00332 020A CDC701   >           CALL    EV50
00333 020D 2A091F               LHLD    1F09H
00334 0210 3A0B1F               LDA     1F0BH
00335 0213 47                   MOV     B,A
00336 0214 EB                   XCHG
00337 0215 2A0F1F               LHLD    1F0FH
00338 0218 3A111F               LDA     1F11H
00339 021B 4F                   MOV     C,A
00340 021C CD4702   >           CALL    ADD3BY
00341 021F EB                   XCHG
00342 0220 2A231F               LHLD    1F23H
00343 0223 3A251F               LDA     1F25H
00344 0226 47                   MOV     B,A
00345 0227 EB                   XCHG
00346 0228 CD5402   >           CALL    SUB3BY
00347 022B 22151F               SHLD    1F15H
00348 022E 79                   MOV     A,C
00349 022F 32171F               STA     1F17H
00350 0232 EB                   XCHG
00351 0233 58                   MOV     E,B
00352 0234 CD2F01   >           CALL    RSH3BY
00353 0237 CD2F01   >           CALL    RSH3BY
00354 023A 22181F               SHLD    1F18H
00355 023D 7B                   MOV     A,E
00356 023E 321A1F               STA     1F1AH
00357 0241 2E15                 MVI     L,15H
00358 0243 CD5F02   >           CALL    EVLIMT
00359 0246 C9                   RET
00360                                   ;C,H,L+-B,D,E
00361 0247 7D           ADD3BY  MOV     A,L
00362 0248 83                   ADD     E
00363 0249 6F                   MOV     L,A
00364 024A 7C                   MOV     A,H
```

```
00365 024B 8A              ADC    D
00366 024C 67              MOV    H,A
00367 024D 79              MOV    A,C
00368 024E 88              ADC    B
00369 024F 4F              MOV    C,A
00370 0250 C9              RET
00371 0251 00              NOP
00372 0252 00              NOP
00373 0253 00              NOP
00374 0254 7D      SUB3BY  MOV    A,L
00375 0255 93              SUB    E
00376 0256 6F              MOV    L,A
00377 0257 7C              MOV    A,H
00378 0258 9A              SBB    D
00379 0259 67              MOV    H,A
00380 025A 79              MOV    A,C
00381 025B 98              SBB    B
00382 025C 4F              MOV    C,A
00383 025D C9              RET
00384 025E 00              NOP
00385                                    ;EVALUATE
00386 025F 3E1F    EVLIMT  MVI    A,1FH
00387 0261 67              MOV    H,A
00388 0262 222B1F          SHLD   1F2BH
00389 0265 5E              MOV    E,M
00390 0266 23              INX    H
00391 0267 56              MOV    D,M
00392 0268 23              INX    H
00393 0269 46              MOV    B,M
00394 026A 2A001F          LHLD   1F00H
00395 026D 3A021F          LDA    1F02H
00396 0270 4F              MOV    C,A
00397 0271 CD9702          CALL   COMP
00398 0274 3A291F          LDA    1F29H
00399 0277 B7              ORA    A
00400 0278 CA7F02          JZ     CONT
00401 027B C9              RET
00402 027C 00              NOP
00403 027D 00              NOP
00404 027E 00              NOP
00405 027F 2A2B1F  CONT    LHLD   1F2BH
00406 0282 7D              MOV    A,L
00407 0283 C603            ADI    03H
00408 0285 6F              MOV    L,A
00409 0286 5E              MOV    E,M
00410 0287 23              INX    H
00411 0288 56              MOV    D,M
00412 0289 23              INX    H
00413 028A 4E              MOV    C,M
00414 028B 2A001F          LHLD   1F00H
00415 028E EB              XCHG
00416 028F 3A021F          LDA    1F02H
00417 0292 47              MOV    B,A
00418 0293 CD9702          CALL   COMP
00419 0296 C9              RET
00420                                    ;COMPARE
00421 0297 7D      COMP    MOV    A,L
```

```
00422  0298  93              SUB     E
00423  0299  7C              MOV     A,H
00424  029A  9A              SBB     D
00425  029B  79              MOV     A,C
00426  029C  98              SBB     B
00427  029D  FAA602    >     JM      RETFLG
00428  02A0  3EFF            MVI     A,0FFH
00429  02A2  32291F          STA     1F29H
00430  02A5  C9              RET
00431  02A6  AF        RETFLG XRA    A
00432  02A7  32291F          STA     1F29H
00433  02AA  C9              RET
00434                                ;GET DATA
00435  02AB  F5        GTDATA PUSH   PSW
00436  02AC  D5              PUSH    D
00437  02AD  E5              PUSH    H
00438  02AE  AF        OVERFL XRA    A
00439  02AF  32061F          STA     SUM
00440  02B2  32071F          STA     SUM+1
00441  02B5  32081F          STA     SUM+2
00442  02B8  32601F          STA     W1FLAG
00443  02BB  32611F          STA     CNT
00444  02BE  DB82      TRYAG  IN     82H
00445  02C0  E640            ANI     40H
00446  02C2  CABE02    >     JZ      TRYAG
00447  02C5  00              NOP
00448  02C6  00              NOP
00449  02C7  00              NOP
00450  02C8  DB83            IN      83H
00451  02CA  E604            ANI     04H
00452  02CC  CADA02    >     JZ      CONT9
00453  02CF  D380            OUT     80H
00454  02D1  C3AE02    >     JMP     OVERFL
00455  02D4  00              NOP
00456  02D5  00              NOP
00457  02D6  00              NOP
00458  02D7  00              NOP
00459  02D8  00              NOP
00460  02D9  00              NOP
00461  02DA  3EFF      CONT9  MVI    A,0FFH
00462  02DC  3A601F          LDA     W1FLAG
00463  02DF  DB83            IN      83H
00464  02E1  E640            ANI     40H
00465  02E3  C23203    >     JNZ     STORE
00466  02E6  21001F          LXI     H,1F00H
00467  02E9  DB80            IN      80H
00468  02EB  2F              CMA
00469  02EC  77              MOV     M,A
00470  02ED  23              INX     H
00471  02EE  DB81            IN      81H
00472  02F0  2F              CMA
00473  02F1  77              MOV     M,A
00474  02F2  23              INX     H
00475  02F3  DB82            IN      82H
00476  02F5  E607            ANI     07H
00477  02F7  2F              CMA
```

```
00478 02F8 77              MOV    M,A
00479 02F9 CDA503  >        CALL   ADDONE
00480 02FC 3A611F    CONT11 LDA    CNT
00481 02FF 3C               INR    A
00482 0300 32611F           STA    CNT
00483 0303 DE05             SBI    05
00484 0305 C24803  >        JNZ    CONT10
00485 0308 AF               XRA    A
00486 0309 32601F           STA    W1FLAG
00487 030C 3A081F           LDA    1F08H
00488 030F E6F0             ANI    0F0H
00489 0311 C2AE02  >        JNZ    OVERFL
00490 0314 2A061F           LHLD   1F06H
00491 0317 3A081F           LDA    1F08H
00492 031A 5F               MOV    E,A
00493 031B CD2F01  >        CALL   RSH3BY
00494 031E CD2F01  >        CALL   RSH3BY
00495 0321 CD2F01  >        CALL   RSH3BY
00496 0324 22231F           SHLD   1F23H
00497 0327 7B               MOV    A,E
00498 0328 32251F           STA    1F25H
00499 032B 00               NOP
00500 032C 00               NOP
00501 032D 00               NOP
00502 032E E1               POP    H
00503 032F D1               POP    D
00504 0330 F1               POP    PSW
00505 0331 C9               RET
00506 0332 21001F    STORE  LXI    H,1F00H
00507 0335 DB80             IN     80H
00508 0337 77               MOV    M,A
00509 0338 23               INX    H
00510 0339 DB81             IN     81H
00511 033B 77               MOV    M,A
00512 033C 23               INX    H
00513 033D DB82             IN     82H
00514 033F E607             ANI    07H
00515 0341 77               MOV    M,A
00516 0342 C3FC02  >        JMP    CONT11
00517 0345 00               NOP
00518 0346 00               NOP
00519 0347 00               NOP
00520 0348 CDC503  >  CONT10 CALL  ADD20B
00521 034B D380             OUT    80H
00522 034D DB82     WAIT1   IN     82H
00523 034F E640             ANI    40H
00524 0351 CA4D03  >        JZ     WAIT1
00525 0354 DB83             IN     83H
00526 0356 E604             ANI    04H
00527 0358 CA9803  >        JZ     ERR
00528 035B DB83             IN     83H
00529 035D E640             ANI    40H
00530 035F C28003  >        JNZ    STORE1
00531 0362 21001F           LXI    H,1F00H
00532 0365 DB80             IN     80H
00533 0367 2F               CMA
00534 0368 77               MOV    M,A
```

```
00535  0369  23              INX     H
00536  036A  DB81            IN      81H
00537  036C  2F              CMA
00538  036D  77              MOV     M,A
00539  036E  23              INX     H
00540  036F  DB82            IN      82H
00541  0371  E607            ANI     07H
00542  0373  2F              CMA
00543  0374  77              MOV     M,A
00544  0375  CDA503  >       CALL    ADDONE
00545  0378  CDC503  >       CALL    ADD20B
00546  037B  D380            OUT     80H
00547  037D  C3BE02  >       JMP     TRYAG
00548  0380  21001F  STORE1  LXI     H,1F00H
00549  0383  DB80            IN      80H
00550  0385  77              MOV     M,A
00551  0386  23              INX     H
00552  0387  DB81            IN      81H
00553  0389  77              MOV     M,A
00554  038A  23              INX     H
00555  038B  DB82            IN      82H
00556  038D  E607            ANI     07H
00557  038F  77              MOV     M,A
00558  0390  CDC503  >       CALL    ADD20B
00559  0393  D380            OUT     80H
00560  0395  C3BE02  >       JMP     TRYAG.
00561  0398  3EFF    ERR     MVI     A,0FFH
00562  039A  D3FF            OUT     0FFH
00563  039C  00              NOP
00564  039D  00              NOP
00565  039E  00              NOP
00566  039F  00              NOP
00567  03A0  00              NOP
00568  03A1  00              NOP
00569  03A2  C3AE02  >       JMP     OVERFL
00570        1F60    W1FLAG  EQU     1F60H
00571        1F61    CNT     EQU     1F61H
00572        1F06    SUM     EQU     1F06H
00573                                ;ADD1
00574  03A5  E5      ADDONE  PUSH    H
00575  03A6  F5              PUSH    PSW
00576  03A7  D5              PUSH    D
00577  03A8  2A001F          LHLD    1F00H
00578  03AB  3A021F          LDA     1F02H
00579  03AE  4F              MOV     C,A
00580  03AF  3E01            MVI     A,01H
00581  03B1  85              ADD     L
00582  03B2  6F              MOV     L,A
00583  03B3  3E00            MVI     A,00H
00584  03B5  8C              ADC     H
00585  03B6  67              MOV     H,A
00586  03B7  3E00            MVI     A,00H
00587  03B9  89              ADC     C
00588  03BA  4F              MOV     C,A
00589  03BB  32021F          STA     1F02H
00590  03BE  22001F          SHLD    1F00H
00591  03C1  D1              POP     D
```

```
00592  03C2  F1                      POP     PSW
00593  03C3  E1                      POP     H
00594  03C4  C9                      RET
00595                                        ;20 BITS ADD
00596  03C5  E5          ADD20B      PUSH    H
00597  03C6  D5                      PUSH    D
00598  03C7  C5                      PUSH    B
00599  03C8  F5                      PUSH    PSW
00600  03C9  00                      NOP
00601  03CA  00                      NOP
00602  03CB  00                      NOP
00603  03CC  00                      NOP
00604  03CD  00                      NOP
00605  03CE  00                      NOP
00606  03CF  21001F                  LXI     H,1F00H
00607  03D2  7E                      MOV     A,M
00608  03D3  5F                      MOV     E,A
00609  03D4  23                      INX     H
00610  03D5  7E                      MOV     A,M
00611  03D6  57                      MOV     D,A
00612  03D7  23                      INX     H
00613  03D8  7E                      MOV     A,M
00614  03D9  4F                      MOV     C,A
00615  03DA  00                      NOP
00616  03DB  00                      NOP
00617  03DC  00                      NOP
00618  03DD  00                      NOP
00619  03DE  00                      NOP
00620  03DF  00                      NOP
00621  03E0  2A061F                  LHLD    1F06H
00622  03E3  19                      DAD     D
00623  03E4  00                      NOP
00624  03E5  00                      NOP
00625  03E6  00                      NOP
00626  03E7  3A081F                  LDA     1F08H
00627  03EA  89                      ADC     C
00628  03EB  22061F                  SHLD    1F06H
00629  03EE  32081F                  STA     1F08H
00630  03F1  F1                      POP     PSW
00631  03F2  C1                      POP     B
00632  03F3  D1                      POP     D
00633  03F4  E1                      POP     H
00634  03F5  C9                      RET
00635                                        ;19 BITS AVVG
00636  03F6  E5          COMPAR      PUSH    H
00637  03F7  D5                      PUSH    D
00638  03F8  F5                      PUSH    PSW
00639  03F9  C5                      PUSH    B
00640  03FA  2A201F                  LHLD    1F20H
00641  03FD  3A221F                  LDA     1F22H
00642  0400  5F                      MOV     E,A
00643  0401  CD2F01                  CALL    RSH3BY
00644  0404  CD2F01                  CALL    RSH3BY
00645  0407  CD2F01                  CALL    RSH3BY
00646  040A  CD2F01                  CALL    RSH3BY
00647  040D  CD2F01                  CALL    RSH3BY
00648  0410  CD2F01                  CALL    RSH3BY
```

```
00649 0413 CD2F01  >          CALL    RSH3BY
00650 0416 222B1F             SHLD    1F2BH
00651 0419 7B                 MOV     A,E
00652 041A 322D1F             STA     1F2DH
00653 041D 43                 MOV     B,E
00654 041E EB                 XCHG
00655 041F 2A231F             LHLD    1F23H
00656 0422 3A251F             LDA     1F25H
00657 0425 4F                 MOV     C,A
00658 0426 CD9702  >          CALL    COMP
00659 0429 C1                 POP     B
00660 042A F1                 POP     PSW
00661 042B D1                 POP     D
00662 042C E1                 POP     H
00663 042D C9                 RET
00664                                         ;F.S.*1 AVG*
00665 042E E5      COMPUT     PUSH    H
00666 042F D5                 PUSH    D
00667 0430 C5                 PUSH    B
00668 0431 F5                 PUSH    PSW
00669 0432 2A201F             LHLD    1F20H
00670 0435 3A221F             LDA     1F22H
00671 0438 47                 MOV     B,A
00672 0439 EB                 XCHG
00673 043A 2A231F             LHLD    1F23H
00674 043D 3A251F             LDA     1F25H
00675 0440 4F                 MOV     C,A
00676 0441 CD9702  >          CALL    COMP
00677 0444 3A291F             LDA     1F29H
00678 0447 B7                 ORA     A
00679 0448 CA6004  >          JZ      CONT1
00680 044B 3EEE               MVI     A,0EEH
00681 044D D386               OUT     86H
00682 044F 3E01               MVI     A,01H
00683 0451 D387               OUT     87H
00684 0453 2F                 CMA
00685 0454 D388               OUT     88H
00686 0456 F1                 POP     PSW
00687 0457 C1                 POP     B
00688 0458 D1                 POP     D
00689 0459 E1                 POP     H
00690 045A 33                 INX     SP
00691 045B 33                 INX     SP
00692 045C C31800  >          JMP     MRDATA
00693 045F 00                 NOP
00694 0460 CDC504  >  CONT1   CALL    FSWEXP
00695 0463 CD0605  >          CALL    ADWEXP
00696 0466 2A301F             LHLD    1F30H
00697 0469 3A331F             LDA     1F33H
00698 046C C3AD04  >          JMP     TEST
00699 046F 5F         OK      MOV     E,A
00700 0470 CD5905  >  OK1     CALL    DIV
00701 0473 79                 MOV     A,C
00702 0474 32351F             STA     1F35H
00703 0477 78                 MOV     A,B
00704 0478 32361F             STA     1F36H
00705 047B 3A341F             LDA     1F34H
```

```
00706 047E 6F              MOV    L,A
00707 047F 3A321F          LDA    1F32H
00708 0482 95               SUB    L
00709 0483 C609            ADI    09H
00710 0485 5F               MOV    E,A
00711 0486 210000          LXI    H,0000H
00712 0489 00              NOP
00713 048A 00              NOP
00714 048B 00              NOP
00715 048C 00              NOP
00716 048D 00              NOP
00717 048E 37              STC
00718 048F 3F              CMC
00719 0490 79       CONT2   MOV    A,C
00720 0491 17              RAL
00721 0492 4F              MOV    C,A
00722 0493 78              MOV    A,B
00723 0494 17              RAL
00724 0495 47              MOV    B,A
00725 0496 7D              MOV    A,L
00726 0497 17              RAL
00727 0498 6F              MOV    L,A
00728 0499 7C              MOV    A,H
00729 049A 17              RAL
00730 049B 67              MOV    H,A
00731 049C 7B              MOV    A,E
00732 049D B7              ORA    A
00733 049E CAA504  >        JZ     DONE
00734 04A1 1D              DCR    E
00735 04A2 C39004  >        JMP    CONT2
00736 04A5 22261F  DONE     SHLD   1F26H
00737 04A8 F1              POP    PSW
00738 04A9 C1              POP    B
00739 04AA D1              POP    D
00740 04AB E1              POP    H
00741 04AC C9              RET
00742                                     ;CHECK OUT
00743 04AD 00       TEST    NOP
00744 04AE BC              CMP    H
00745 04AF D2B504  >        JNC    MORE1
00746 04B2 C36F04  >        JMP    OK
00747 04B5 37       MORE1   STC
00748 04B6 3F              CMC
00749 04B7 1F              RAR
00750 04B8 5F              MOV    E,A
00751 04B9 3A341F          LDA    1F34H
00752 04BC 3C              INR    A
00753 04BD 32341F          STA    1F34H
00754 04C0 C37004  >        JMP    OK1
00755 04C3 00              NOP
00756 04C4 00              NOP
00757                                     ;GET 16 BITS
00758 04C5 E5       FSWEXP  PUSH   H
00759 04C6 C5              PUSH   B
00760 04C7 D5              PUSH   D
00761 04C8 F5              PUSH   PSW
00762 04C9 0600            MVI    B,00H
```

```
00763  04CB  2A201F          LHLD    1F20H
00764  04CE  3A221F          LDA     1F22H
00765  04D1  4F              MOV     C,A
00766  04D2  CD4D05          CALL    LSH3BY
00767  04D5  CD4D05          CALL    LSH3BY
00768  04D8  CD4D05          CALL    LSH3BY
00769  04DB  CD4D05          CALL    LSH3BY
00770  04DE  CD4D05          CALL    LSH3BY
00771  04E1  CD4D05   CONT3  CALL    LSH3BY
00772  04E4  00              NOP
00773  04E5  DAEF04          JC      GOTIT
00774  04E8  04              INR     B
00775  04E9  C3E104          JMP     CONT3
00776  04EC  00              NOP
00777  04ED  00              NOP
00778  04EE  00              NOP
00779  04EF  59       GOTIT  MOV     E,C
00780  04F0  CD4305          CALL    RSH
00781  04F3  3E13            MVI     A,13H
00782  04F5  90              SUB     B
00783  04F6  32321F          STA     1F32H
00784  04F9  7C              MOV     A,H
00785  04FA  32301F          STA     1F30H
00786  04FD  7B              MOV     A,E
00787  04FE  32311F          STA     1F31H
00788  0501  F1              POP     PSW
00789  0502  D1              POP     D
00790  0503  C1              POP     B
00791  0504  E1              POP     H
00792  0505  C9              RET
00793                                ;GET 8 BITS
00794  0506  E5       ADWEXP PUSH    H
00795  0507  D5              PUSH    D
00796  0508  C5              PUSH    B
00797  0509  F5              PUSH    PSW
00798  050A  0600            MVI     B,00H
00799  050C  2A231F          LHLD    1F23H
00800  050F  3A251F          LDA     1F25H
00801  0512  4F              MOV     C,A
00802  0513  CD4D05          CALL    LSH3BY
00803  0516  CD4D05          CALL    LSH3BY
00804  0519  CD4D05          CALL    LSH3BY
00805  051C  CD4D05          CALL    LSH3BY
00806  051F  CD4D05          CALL    LSH3BY
00807  0522  CD4D05   TRY    CALL    LSH3BY
00808  0525  00              NOP
00809  0526  DA3005          JC      GOTIT2
00810  0529  04              INR     B
00811  052A  C32205          JMP     TRY
00812  052D  00              NOP
00813  052E  00              NOP
00814  052F  00              NOP
00815  0530  59       GOTIT2 MOV     E,C
00816  0531  CD4305          CALL    RSH
00817  0534  3E13            MVI     A,13H
00818  0536  90              SUB     B
00819  0537  32341F          STA     1F34H
```

```
00820 053A 7B                      MOV     A,E
00821 053B 32331F                  STA     1F33H
00822 053E F1                      POP     PSW
00823 053F C1                      POP     B
00824 0540 D1                      POP     D
00825 0541 E1                      POP     H
00826 0542 C9                      RET
00827                                      ;RIGHT SHIFT
00828 0543 7B            RSH       MOV     A,E
00829 0544 1F                      RAR
00830 0545 5F                      MOV     E,A
00831 0546 7C                      MOV     A,H
00832 0547 1F                      RAR
00833 0548 67                      MOV     H,A
00834 0549 7D                      MOV     A,L
00835 054A 1F                      RAR
00836 054B 6F                      MOV     L,A
00837 054C C9                      RET
00838                                      ;LEFT SHIFT
00839 054D 37            LSH3BY    STC
00840 054E 3F                      CMC
00841 054F 7D                      MOV     A,L
00842 0550 17                      RAL
00843 0551 6F                      MOV     L,A
00844 0552 7C                      MOV     A,H
00845 0553 17                      RAL
00846 0554 67                      MOV     H,A
00847 0555 79                      MOV     A,C
00848 0556 17                      RAL
00849 0557 4F                      MOV     C,A
00850 0558 C9                      RET
00851                                      ;DIV
00852 0559 160F          DIV       MVI     D,0FH
00853 055B 7C            AGAIN     MOV     A,H
00854 055C 93                      SUB     E
00855 055D DA7F05 >                JC      ADBACK
00856 0560 67            CONT7     MOV     H,A
00857 0561 29                      DAD     H
00858 0562 DA8F05 >                JC      SETFLG
00859 0565 37            CONT5     STC
00860 0566 79            CONT4     MOV     A,C
00861 0567 17                      RAL
00862 0568 4F                      MOV     C,A
00863 0569 00                      NOP
00864 056A 00                      NOP
00865 056B 00                      NOP
00866 056C 00                      NOP
00867 056D 00                      NOP
00868 056E 00                      NOP
00869 056F 78                      MOV     A,B
00870 0570 17                      RAL
00871 0571 47                      MOV     B,A
00872 0572 7A                      MOV     A,D
00873 0573 B7                      ORA     A
00874 0574 CAAE05 >                JZ      DONE1
00875 0577 15                      DCR     D
00876 0578 00                      NOP
```

```
00877 0579 C35B05  >           JMP    AGAIN
00878 057C 00                  NOP
00879 057D 00                  NOP
00880 057E 00                  NOP
00881 057F 3A1F1F     ADBACK   LDA    1F1FH
00882 0582 B7                  ORA    A
00883 0583 C2A205  >           JNZ    SUBB
00884 0586 29                  DAD    H
00885 0587 DA9705  >           JC     SETFL2
00886 058A 37         CONT6    STC
00887 058B 3F                  CMC
00888 058C C36605  >           JMP    CONT4
00889 058F 3EFF       SETFLG   MVI    A,0FFH
00890 0591 321F1F              STA    1F1FH
00891 0594 C36505  >           JMP    CONT5
00892 0597 3EFF       SETFL2   MVI    A,0FFH
00893 0599 321F1F              STA    1F1FH
00894 059C C38A05  >           JMP    CONT6
00895 059F 00                  NOP
00896 05A0 00                  NOP
00897 05A1 00                  NOP
00898 05A2 AF         SUBB     XRA    A
00899 05A3 321F1F              STA    1F1FH
00900 05A6 7C                  MOV    A,H
00901 05A7 93                  SUB    E
00902 05A8 C36005  >           JMP    CONT7
00903 05AB 00                  NOP
00904 05AC 00                  NOP
00905 05AD 00                  NOP
00906 05AE AF         DONE1    XRA    A
00907 05AF 321F1F              STA    1F1FH
00908 05B2 C9                  RET
00909                                 ;SUB.OFFSET
00910 05B3 E5         SUBOFF   PUSH   H
00911 05B4 D5                  PUSH   D
00912 05B5 F5                  PUSH   PSW
00913 05B6 C5                  PUSH   B
00914 05B7 2A231F              LHLD   1F23H
00915 05BA 3A251F              LDA    1F25H
00916 05BD 57                  MOV    D,A
00917 05BE DB8C                IN     8CH
00918 05C0 5F                  MOV    E,A
00919 05C1 DB8D                IN     8DH
00920 05C3 47                  MOV    B,A
00921 05C4 7D                  MOV    A,L
00922 05C5 93                  SUB    E
00923 05C6 6F                  MOV    L,A
00924 05C7 7C                  MOV    A,H
00925 05C8 98                  SBB    B
00926 05C9 67                  MOV    H,A
00927 05CA 7A                  MOV    A,D
00928 05CB DE00                SBI    00H
00929 05CD 57                  MOV    D,A
00930 05CE FAE305  >           JM     OVER1
00931 05D1 22381F              SHLD   1F38H
00932 05D4 7A                  MOV    A,D
00933 05D5 323A1F              STA    1F3AH
```

```
00934  05D8  C1            POP    B
00935  05D9  F1            POP    PSW
00936  05DA  D1            POP    D
00937  05DB  E1            POP    H
00938  05DC  C9            RET
00939  05DD  00            NOP
00940  05DE  00            NOP
00941  05DF  00            NOP
00942  05E0  00            NOP
00943  05E1  00            NOP
00944  05E2  00            NOP
00945  05E3  C1      OVER1 POP    B
00946  05E4  F1            POP    PSW
00947  05E5  D1            POP    D
00948  05E6  E1            POP    H
00949  05E7  33            INX    SP
00950  05E8  33            INX    SP
00951  05E9  3E01          MVI    A,01H
00952  05EB  D389          OUT    89H
00953  05ED  C30000        JMP    START
00954                      END
```

What is claimed is:

1. In a mass flow rate meter of the coriolis force type having a support, a U-shaped tube including two side legs joined by a cross member with the free ends of the side legs attached to said support and forming an inlet and an outlet for flowable material flowing through said U-shaped tube, and a means for vibrating the bight end of said U-shaped tube perpendicular to the plane of the U-shaped tube, the improvement comprising:

sensor means on each of the side legs of said U-shaped tube for sensing the time difference between one of the legs crossing a predetermined point in the path of the oscillation caused by said vibrating means and the other of the legs crossing said predetermined point of oscillation for giving an indication of the mass flow of the material flowing through said U-shaped tube;

indicating means in said sensor means for indicating the first side leg to cross said predetermined point of oscillation; and selecting means responsive to said indicating means for selecting one of giving a time representation equal to the sum of the time difference between crossing of said predetermined point of oscillation of said legs during the previous half cycle of oscillation and the time difference for crossing said predetermined point during the present half cycle, and giving a time representation equal to the absolute value of the subtraction of the time difference between crossing of said predetermined point of oscillation of said legs during the previous half cycle of oscillation from the time difference during the present half cycle depending on said side leg which crosses said predetermined point of oscillation first, thereby giving an indication of the mass flow of the material flowing through said U-shaped tube.

2. The mass flow rate meter of claim 1 further comprising:

averaging means responsive to said selecting means for providing a signal indicating the average of a plurality of time representations from said selecting means for a predetermined number of cycles;

rejecting means responsive to said averaging means for rejecting time representations having a predetermined variance from said averaging means signal;

adjustable means for adjusting the level of said predetermined variance of said rejecting means; and output means providing a signal proportionate to unrejected ones of said time representations of representing the mass flow of material flowing through said U-shaped tube.

3. The mass flow rate meter of claim 1 further comprising:

optical sensor means symmetrically located on each of the side legs of said U-shaped tube each for generating a generally square shaped wave when the optical sensor means is switched between the on and off positions, the generally square shaped wave of one optical sensor means having a rising edge and a falling edge substantially parallel to the rising edge and falling edge of the other optical sensor means;

amplitude controlling means for controlling the amplitude imparted by the vibrating means to the U-shaped tube;

amplitude discriminator means for providing indications when the generally square shaped wave of each optical sensor means rises above a predetermined point and falls below a predetermined point; and timing means for measuring the time between successive indications from said discriminator means during the rising of said generally square shaped wave of one optical sensor means from the rising of said generally square shaped wave of the other optical sensor means, and for measuring the time between successive indications from said discriminator means during the falling of said generally square shaped wave of one optical sensor means from the falling of said generally square shaped wave of the other optical sensor means.

4. The mass flow rate meter of claim 1 further comprising:
averaging means responsive to said selecting means for providing a signal indicating a plurality of time representations from said selecting means for a predetermined number of cycles; and
variable means for selecting a number of cycles in the plurality of time representations of said selecting means for use by the averaging means.

5. The mass flow rate meter of claim 1 further comprising:
means responsive to said selecting means for giving an indication representative of the direction of flow of mass through said mass flowmeter.

6. In a mass flow rate meter of the coriolis force type having a support, a U-shaped tube including a first side leg and a second side leg joined by a cross member with the free end of the side legs attached to said support and forming an inlet and outlet for flowable material flowing through said U-shaped tube, and a means for vibrating the bight end of said U-shaped tube perpendicular to the plane of the U-shaped tube, the improvement comprising:
sensor means on each of the side legs of said U-shaped tube for sensing the time difference between one of the legs crossing a predetermined point in the path of the oscillation caused by said vibrating means and the other of the legs crossing said predetermined point of oscillation for giving an indication of the mass flow of the material flowing through said U-shaped tube;
indicating means in said sensor means for indicating which of said first side leg and said second side leg crosses said predetermined point of oscillation before the other;
means responsive to said indicating means for assigning a negative value to said time difference if said first side leg crosses said predetermined point of oscillation before said second side leg, and for assigning a positive value to said time difference if said second side leg crosses said predetermined point of oscillation prior to said first side leg;
means for algebraically adding the time difference of one half cycle of oscillation with its assigned value together with the time difference of a succeeding half cycle of oscillation with its assigned value; and
output means responsive to the sign of the sum of said adding means for providing an indication of the direction of flow of the material through the flowmeter.

7. The apparatus of claim 6 further comprising means responsive to the absolute value of the sum of said adding means for providing an indication of the mass flow flowing through said meter.

8. The apparatus of claim 6 further comprising means responsive to said output means for terminating the flow of material through said flowmeter when the direction of flow through the flowmeter indicated by said output means is in an undesired direction.

9. In a mass flow rate meter of coriolis force type having a support, a U-shaped tube including a first side leg and a second side leg joined by a cross member with the free end of the side legs attached to said support and forming an inlet and outlet for flowable material flowing through said U-shaped tube, and a means for vibrating the bight end of said U-shaped tube perpendicular to the plane of the U-shaped tube, the method comprising:
sensing the time difference between one of the legs crossing a predetermined point in the path of the oscillation caused by said vibrating means and the other of the legs crossing said predetermined point of oscillation for giving an indication of the mass flow of the material flowing through said U-shaped tube;
providing an indication of which of said first side leg and said second side leg crosses said predetermined point of oscillation before the other;
responsive to said indication, performing one of assigning a negative value to said time difference if said first side leg crosses said predetermined point of oscillation before said second side leg, and assigning a positive value to said time difference if said second side leg crosses said predetermined point of oscillation prior to said first side leg;
algebraically adding the time difference of one half cycle of oscillation with its assigned value together with the time difference of a second succeeding half cycle of oscillation with its assigned value; and
responsive to the sign of the sum of said adding means, providing an indication of the mass flow of the material flowing through the flowmeter.

10. The method of claim 9 further comprising determining the absolute value of the sum of said adding step and providing an indication of the mass flowing through said meter responsive to said sum.

11. The method of claim 9 further comprising terminating the flow of material through said flowmeter when the sign of the sum of said adding step indicates the flow through said flowmeter is in an undesired direction.

12. In a mass flow rate meter of the coriolis force type having a support, a U-shaped tube including two side legs joined by a cross member with the free ends of the side legs attached to said support and forming an inlet and an outlet for flowable material flowing through said U-shaped tube, and a means for vibrating the bight end of said U-shaped tube perpendicular to the plane of the U-shaped tube, the improvement comprising:
sensor means on each of the side legs of said U-shaped tube for sensing the time difference between one of the legs crossing a predetermined point in the path of the oscillation caused by said vibrating means and the other of the legs crossing said predetermined point of oscillation for giving an indication of the mass flow of the material flowing through said U-shaped tube;
indicating means in said sensor means for indicating the first side leg to cross said predetermined point of oscillation; and
selecting means responsive to said indicating means for selecting, dependent on the side leg which crosses said predetermined point of oscillation first, one of giving a time representation equal to the sum of the time difference sensed during the previous half cycle of oscillation and the time difference sensed during the present half cycle, and giving a time representation equal to the difference between the time difference sensed during the previous half cycle of oscillation and the time difference sensed during the present half cycle, thereby giving an indication of the mass flow of the material flowing through said U-shaped tube.

13. The mass flow rate meter of claim 12 further comprising:
  averaging means responsive to said selecting means for providing a signal indicating the average of a plurality of time representations from said selecting means for a predetermined number of cycles,
  rejecting means responsive to said averaging means for rejecting time representations having a predetermined variance from said averaging means signal,
  adjustable means for adjusting the level of said predetermined variance of said rejecting means, and
  output means for providing a signal proportionate to unrejected ones of said time representations for representing the mass flow of material flowing through said U-shaped tube.

14. The mass flow rate meter of claim 12 further comprising:
  optical sensor means symmetrically located on each of the side legs of said U-shaped tube each for generating a generally square shaped wave when the optical sensor means is switched between the on and off positions, the generally square shaped wave of one optical sensor means having a rising edge and a falling edge substantially parallel to the rising edge and falling edge of the other optical sensor means;
  amplitude controlling means for controlling the amplitude imparted by the vibrating means to the U-shaped tube;
  amplitude discriminator means for providing indications when the generally square shaped wave of each optical sensor means rises above a predetermined point and falls below a predetermined point; and
  timing means for measuring the time between successive indications from said discriminator means during the rising of said generally square shaped wave of one optical sensor means from the rising of said generally square shaped wave of the other optical sensor means, and for measuring the time between successive indications from said discriminator means during the falling of said generally square shaped wave of one optical sensor means from the falling of said generally square shaped wave of the other optical sensor means.

15. The mass flow rate meter of claim 12 further comprising:
  averaging means responsive to said selecting means for providing a signal indicating a plurality of time representations from said selecting means for a predetermined number of cycles, and
  variable means for selecting a number of cycles in the plurality of time representations of said selecting means for use by the averaging means.

16. The mass flow rate meter of claim 12 further comprising:
  means responsive to said selecting means for giving an indication representative of the direction of flow of mass through said mass flowmeter.

17. In a mass flow rate meter of the coriolis force type having a support, a U-shaped tube including two side legs joined by a cross member with the free ends of the side legs attached to said support and forming an inlet and an outlet for flowable material flowing through said U-shaped tube, and a means for vibrating the bight end of said U-shaped tube perpendicular to the plane of the U-shaped tube, the method comprising:
  sensing the time difference between one of the legs crossing a predetermined point in the path of the oscillation caused by said vibrating means and the other of the legs crossing said predetermined point oscillation for giving an indication of the mass flow of the material flowing through said U-shaped tube;
  providing an indication of the first side leg to cross said predetermined point of oscillation; and
  responsive to said indication, selecting one of giving a time representation equal to the sum of the time difference between crossing of said predetermined point of oscillation of said legs during the previous half cycle of oscillation and the time difference for crossing said predetermined point during the present half cycle, and giving a time representation equal to the absolute value of the subtraction of the time difference between crossing of said predetermined point of oscillation of said legs during the previous half cycle of oscillation from the time difference during the present half cycle depending on said side leg which crosses said predetermined point of oscillation first, thereby giving an indication of the mass flow of the material flowing through said U-shaped tube.

18. A mass flowmeter comprising:
  a base;
  two tubes formed in U-shaped loops with the free ends of the loops attached to said base such that the bight ends are cantilevered from said base, said loops further arranged with one loop positioned above the other loop such that when the loops are at rest, the sides and bight ends of the loops are aligned one above the other with the planes of the loops substantially parallel and in fork like relationship with said base;
  vibrating means centered on the bight ends of the loop for alternately attracting and repelling the bight ends of the loops toward and away from one another respectively for inducing vibrations of the two loops like the tines of a tuning fork;
  first and second sensor means symmetrically located on matching sides of the loops for alternately turning on and off as the sides of the loops alternately pass through a predetermined point during the vibrations induced by said vibrating means; said sensor means calibrated such that when the loops are at rest, the first sensor means is in the off condition and the second sensor means is in the on condition, the open ends of the loops being interconnected such that with flow in a normal direction through the loops and vibration induced in the loops, the second sensor means turns on earlier with increasing flow;
  timing means for making a first time measurement between the turning on of the first and second sensor means during one half cycle of the vibration of the loops, and for making a second time measurement between the turning off of the first and second sensor means in an immediately following half cycle of the vibration of the loops;
  calculation means for generating a signal including a first signal portion responsive to the order of turning on of said first and second sensor means having a first polarity when the first sensor means turns on before the second sensor means in said one half cycle of vibration and having a second opposite polarity when the second sensor means turns on before the first sensor means in said one half cycle of vibration, said circuit means signal further including a second signal portion responsive to the order of turning off of said first and second sensor means having said opposite polarity when the second sensor means turns off prior to the first sensor means in said following half cycle of vibration and having said first polarity when the first sensor means turns off prior to the second sensor means in said following half cycle of vibration;

adding means responsive to said circuit means signal for assigning a negative value to said first time measurement when said first signal portion has said first polarity, for assigning a positive value to said first time measurement when said first signal portion has said opposite polarity, for assigning a negative value to said second time measurement when said second signal portion has said first polarity, and for assigning a positive value to said second time measurement when said second signal portion has said opposite polarity; and said adding means includes means for algebraically adding said first time measurement with its assigned value to said second time measurement with its assigned value for providing an indication of the mass flow of material flowing through said U-shaped tubes.

19. The flowmeter of claim 18 further comprising means responsive to the sign of the sum determined by said adding means for indicating the sign of said sum whereby the direction of flow of material through said flowmeter is indicated.

20. In a mass flow rate meter of the coriolis force type having a support, a U-shaped tube including two side legs joined by a cross member wth the free ends of the side legs attached to said support and forming an inlet and an outlet for flowable material flowing through said U-shaped tube, and a means for vibrating the bight end of said U-shaped tube perpendicular to the plane of the U-shaped tube, the method comprising:

sensing the time difference between one of the legs crossing a predetermined point in the path of the oscillation caused by said vibrating means and the other of the legs crossing said predetermined point of oscillation for giving an indication of the mass flow of the material flowing through said U-shaped tube; providing an indication of the first side leg to cross said predetermined point of oscillation; and responsive to said indication, selecting one of giving a time representation equal to the sum of the time difference sensed during the previous half cycle of oscillation and the time difference sensed during the present half cycle, and giving a time representation equal to the difference between the time difference sensed during the previous half sycle of oscillation and the time difference sensed during the present half cycle, thereby giving an indication of the mass flow of the material flowing through said U-shaped tube.

* * * * *

UNITED STATES PATENT AND TRADEMARK OFFICE
CERTIFICATE OF CORRECTION

PATENT NO. : 4,192,184
DATED : March 11, 1980
INVENTOR(S) : Bruce M. Cox and Morris D. Ho It is certified that error appears in the above-identified patent and that said Letters Patent are hereby corrected as shown below:

Column 7, line 56, after offset, delete "and" and insert --angle--.

Column 15, line 15, delete "does" and insert --goes--.

Column 16, line 44, delete the number "15" and insert the number --115--.

Column 24, line 5, delete "Sant" and insert --Santa--.

Claim 2, column 62, line 40, after representations, delete "of" and insert --for--.

Claim 17, column 66, line 4, after point insert --of--.

Claim 20, column 68, line 5, delete "wth" and insert --with--.

Signed and Sealed this

Eighth Day of July 1980

[SEAL]

Attest:

SIDNEY A. DIAMOND

Attesting Officer

Commissioner of Patents and Trademarks